US012670269B2

(12) United States Patent
Palladino et al.

(10) Patent No.: US 12,670,269 B2
(45) Date of Patent: Jun. 30, 2026

(54) SYSTEM AND METHOD FOR AN EGRESS WEB GATEWAY TO REGULATE AI APPLICATION QUERIES

(71) Applicant: KONG INC., San Francisco, CA (US)

(72) Inventors: Marco Palladino, San Francisco, CA (US); Saju Pillai, San Francisco, CA (US)

(73) Assignee: KONG INC., San Francisco, CA (US)

( * ) Notice: Subject to any disclaimer, the term of this patent is extended or adjusted under 35 U.S.C. 154(b) by 122 days.

(21) Appl. No.: 18/440,743

(22) Filed: Feb. 13, 2024

(65) Prior Publication Data

US 2025/0258938 A1    Aug. 14, 2025

(51) Int. Cl.
*G06F 21/60* (2013.01)
*G06F 21/62* (2013.01)

(52) U.S. Cl.
CPC ........ *G06F 21/604* (2013.01); *G06F 21/6227* (2013.01); *G06F 21/6254* (2013.01)

(58) Field of Classification Search
CPC ............... G06F 21/604; G06F 21/6227; G06F 21/6254–6263; G06F 21/6281; G06N 20/00
See application file for complete search history.

(56) References Cited

U.S. PATENT DOCUMENTS

2024/0394404 A1 * 11/2024 O'Neal ............... G06F 21/6245

* cited by examiner

*Primary Examiner* — Kevin Bechtel
(74) *Attorney, Agent, or Firm* — Perkins Coie LLP; Colin Fowler; Willa Wu

(57) ABSTRACT
The technology discloses governing AI inputs and integrating multiple generative AI models through an egress web gateway. The technology involves a client application, a generative AI API, and an egress web gateway to facilitate secure and controlled communication by inspecting and revising communications between the client application and the generative AI API. The inspection is done by comparing the communication against predetermined criteria, which ensures secure and controlled egress from the client application to the generative AI API. In addition, the technology supports multiple generative AI providers, allowing dynamic switching through a unified egress point. Additionally, the technology offers integration of various generative AI models with one user input.

29 Claims, 20 Drawing Sheets

*(AI Proxy)*

SYSTEM AND METHOD FOR AN EGRESS WEB GATEWAY TO REGULATE AI APPLICATION QUERIES

BACKGROUND

Artificial intelligence ("AI") models often operate based on extensive and enormous training models. The models include a multiplicity of inputs and how each should be handled. Then, when the model receives a new input, the model produces an output based on patterns determined from the data the model was trained on.

Large language models ("LLMs") are trained using large datasets to enable them to perform natural language processing ("NLP") tasks such as recognizing, translating, predicting, or generating text or other content. One example of an existing LLM is ChatGPT. A recent trend in AI is to make use of general-purpose generative AI applications built on LLMs. An example of such an application is the ChatGPT family of OpenAI models. These sorts of models make use of a natural language chat interface for humans to make requests to the AI. At the time of filing, general-purpose generative AI's first attempt at responding to a user's queries is middling and requires query refinement from the user. Over the course of a given chat session, the user refines their queries, and the general-purpose model provides a better response.

Plug-ins, short for "plug-in software" or "add-ons," are modular components that extend the functionality of a software application by providing additional features or capabilities. Plug-ins follow a modular design, allowing developers to create and distribute them separately from the core application. Plug-ins interface with the client application through predefined Application Programming Interfaces (APIs) or hooks in the software's architecture, allowing the plug-in to access and augment the functionalities of the client application.

DETAILED DESCRIPTION

Figure 1:
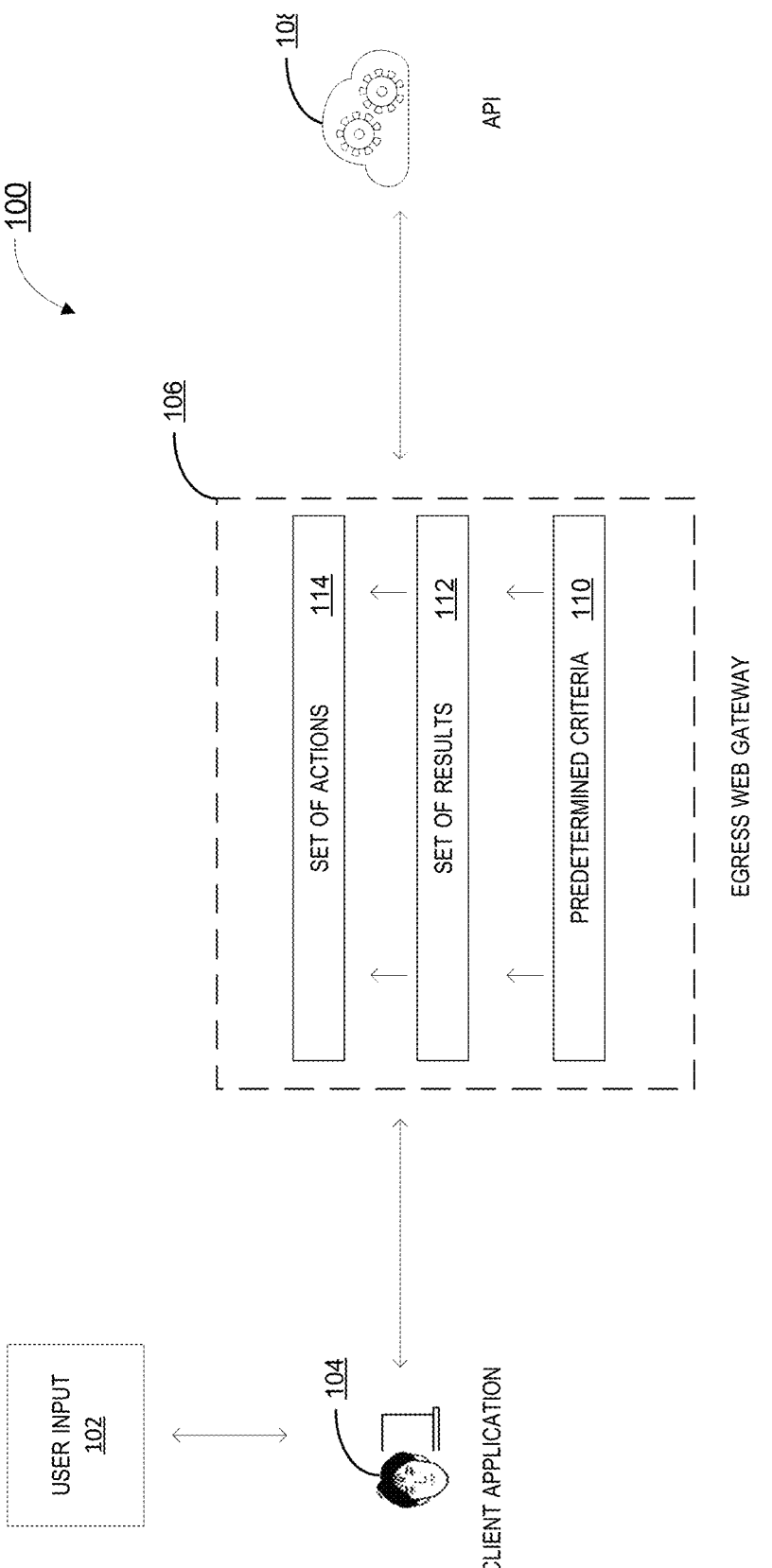
FIG. 1 is a diagram illustrating an egress web gateway, according to an embodiment of the disclosed technology.

AI applications (generative and otherwise) have emerged as powerful tools across various domains, from natural language processing to content creation, providing capabilities to generate human-like responses and creative outputs. Users interact with these applications, often powered by Large Language Models (LLMs), through client interfaces, seeking responses, recommendations, or creative outputs tailored to their inputs.

As organizations increasingly leverage AI models to enhance their processes and decision-making, the protection of sensitive information and data becomes paramount. Security breaches or unauthorized access to confidential data (such as credentials, API keys, etc.) pose significant risks, not only in terms of regulatory compliance but also in preserving the trust of users and stakeholders. In the context of AI, where models are trained on diverse datasets, ensuring the confidentiality of proprietary information, intellectual property, and personally identifiable information (PII) is crucial.

Many AI applications involve processing data that potentially contains trade secrets, strategic business insights, or confidential customer details. Without security measures, organizations expose themselves to the potential loss or compromise of sensitive information, potentially leading to reputational damage or legal ramifications. Maintaining the confidentiality of sensitive information is especially pertinent as AI applications often deal with sensitive data, making them attractive targets for cyber adversaries. To foster trust and compliance, effective AI governance necessitates the ability to regulate information flow, sanitize data to prevent sensitive information leakage, and ensure responsible AI adoption within organizational boundaries. One of the aspects to control within the performance of generative AI applications is the egress, or the outbound flow of data from the client application to external entities, such as specialized AI providers for specific tasks (such as Cohere), cloud-based AI providers (such as OpenAI), or self-hosted AI providers (such as Mistral).

An improvement to the engagement of AI by organizations makes use of a unified egress point for AI to serve as a centralized point for configuring, monitoring, and regulating AI traffic. To harness the full spectrum of AI functionalities, organizations often find themselves needing to utilize a combination of models, each optimized for specific tasks or domains. The centralized egress enables rule enforcement, monitoring, and the establishment of a secure pathway for responsible AI consumption. The centralized egress also empowers organizations to monitor and control AI usage, block unauthorized access, and create standardized guidelines for command set consumption.

The egress process becomes particularly complex when dealing with multiple generative AI models from different providers, each with a unique set of features, formats, and interfaces. Organizations adopting AI often encounter scenarios where different models have specific command formats or response structures, creating compatibility issues when interfacing with a standardized client application. The ability to dynamically reformat inputs or responses within the egress web gateway (e.g., API gateway), without requiring extensive modifications from the client application, allows for a flexible integration of diverse AI models in an organization. By enabling the egress web gateway to automatically reformat inputs or responses, organizations are able to integrate various AI models without burdening the client application with the intricacies of adapting to each model's features. This capability becomes particularly crucial in dynamic AI ecosystems where models further develop, or new models are introduced.

The egress web gateway acts as an intermediary between the client application and the generative AI application(s). When a user request is received by the client application, the system undergoes a review process, where the system assesses the user request or generative AI application response by, in some embodiments, employing heuristics and/or comparisons to predetermined criteria. The set of predetermined criteria in the described embodiments includes technical specifications for inspecting user input (such as grammatical correctness, semantic criteria, format validation criteria, etc.) and/or criteria to help detect sensitive information in the user input (such as algorithms to flag potential sensitive information, predefined lists of confidential information, etc.). The system, in response to the review process, curates a set of actions based on the results of the review process, ranging from adapting the format of the user input to implementing security measures such as discarding or modifying portions of user requests.

For example, a user attempts to access an AI application through a client application. Upon detecting an access attempt, the egress web gateway redirects the user to a webpage that emulates the user interface of the client application. The redirection ensures that users interact with a webpage hosted by the egress web gateway, as opposed to the unsecured AI environment. The webpage, in some embodiments, allows users to input queries for the AI application. The egress web gateway would then, in some embodiments, inspect and revise user inputs based on predetermined criteria and execute actions on the user input (such as modifying the user input or removing sensitive information) that adhere to the organization's security standards.

While the present egress web gateway is described in detail for use with AI application governance, the egress web gateway could be applied, with appropriate modifications, to improve the playability of other applications, making the egress web gateway a valuable tool for diverse applications beyond AI governance. The examples provided in this paragraph are intended as illustrative and are not limiting. Any other game referenced in this document, and many others unmentioned are equally appropriate after appropriate modifications.

The invention is implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description that references the accompanying figures follows. The scope of the invention is limited only by the claims and the invention encompasses numerous alternatives, modifications, and equivalents. Numerous specific details are set forth in the following description in order to provide a thorough understanding of the disclosure. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Egress Control

FIG. 1 is a diagram illustrating an egress web gateway 100, according to an embodiment of the disclosed technology.

The operational flow is initiated by the transmission of user input 102 from the client application 104 to the egress web gateway (e.g., API gateway) 106. In some embodiments, the user input is a prompt (e.g., command set or instruction set) to be input in a generative AI API 108 (e.g., "What does API stand for?"). User input 102 constitutes the information provided by users through the client application 104. In some embodiments, the client application 104 is structured as a web browser or a more generic API, as further discussed in FIG. 10. The user input 102, in some embodiments, is a broad range of data, including but not limited to: textual queries, voice commands, image descriptions, or any other form of interaction initiated by users. The egress web gateway 106 acts as a point where the user input 102 is intercepted and subsequently processed. Herein, reference is repeatedly made to a "generative" AI. A generative AI refers to a particular style of AI model. However, reference to this particular style is intended as exemplary. Other styles of AI could be addressed in a similar manner as appropriate.

The egress web gateway 106, in some embodiments, operates as a plugin to interconnect the client application and the generative AI API 108. The egress web gateway 106, in some embodiments, includes distinct modules, such as data interception, inspection, or action execution. In some embodiments, containerization methods such as Docker are used within the egress web gateway to ensure uniform deployment across environments and minimize dependencies. The data interception module, in some embodiments, employs WebSocket communication for real-time data retrieval from the client application 104 to ensure low-latency bidirectional interactions. The inspection module, in some embodiments, utilizes advanced natural language processing (NLP) algorithms to perform dynamic pattern recognition and generates results against a predetermined set of criteria 110. The action execution module, in some embodiments, orchestrates a set of actions based on inspection results, allowing for, if needed, the adjustment or discarding of user input 102 before reaching the generative AI API 108.

In some embodiments, the egress web gateway 106 is deployed in a cloud environment hosted by a cloud provider, or a self-hosted environment.

In a cloud environment, the egress web gateway has the scalability of cloud services provided by platforms (e.g., AWS, Azure). In some embodiments, deploying the egress web gateway 106 in a cloud environment entails selecting the cloud service, provisioning resources dynamically through the provider's interface or APIs, and configuring networking components for secure communication.

Conversely, in a self-hosted environment, the egress web gateway 106 is deployed on a private web server. In some embodiments, deploying the egress web gateway 106 in a self-hosted environment entails setting up the server with the necessary hardware or virtual machines, installing an operating system, and deploying the egress web gateway 106 application.

Upon receiving the user input from the client application, the egress web gateway 106 inspects the user input 102 using a predetermined set of criteria 110. The predetermined set of criteria 110, in some embodiments, is designed to scrutinize various aspects of the user input, such as syntactic, semantic, or contextual attributes. The predetermined set of criteria 110, in some embodiments, assesses satisfaction of the user input 102 with specified standards, to ensure the appropriateness of the user input 102 for downstream processing. In some embodiments, the downstream processing is consuming a generative AI API 108. Inputs 102, in some embodiments, undergo feature extraction or semantic analysis, allowing the system to discern contextual elements and adjust the user input 102 based on the predetermined set of criteria 110. In the case of voice-based user input 102, in some embodiments, advanced natural language processing (NLP) algorithms are first employed on the user input 102 to transcribe and analyze spoken words.

The set of predetermined criteria 110, in some embodiments, encompasses a range of technical specifications tailored for the inspection of user input 102. Syntactic criteria involve, in some embodiments, parsing the user input 102 for grammatical correctness, ensuring accurate verb-noun agreement, and proper sentence formation. Semantic criteria, in some embodiments, use sentiment analysis, extracting emotions conveyed in the text, and employing named entity recognition to identify entities like names, locations, and dates. Anonymization algorithms, in some embodiments, within the predetermined criteria 110, utilize techniques such as tokenization or masking to identify sensitive information like names or email addresses or create generic placeholders to safeguard user or company privacy. Format validation criteria, on the other hand, in some embodiments, scrutinize the user input's conformity to predefined data formats to ensure compatibility with the generative AI API 108.

In some embodiments, predetermined criteria 110 includes algorithms used for detecting potentially sensitive information (described further in FIGS. 6A and 6B) in user input 102. For example, the predetermined criteria 110 inspects for patterns indicative of personal details such as names, addresses, or other personally identifiable information (PII). If identified, the egress web gateway 106 subsequently would apply anonymization or removal techniques, as discussed further in FIGS. 6A and 6B. For example, predetermined criteria 110 includes sensitive political topics that an organization does not want employees to be inputting into the generative AI API 108.

The set of results 112, generated from the inspection of the user input 102 against the predetermined set of criteria 110, catalogs the degree of adherence of the user input to the predetermined set of criteria 110. The set of results 112 acts as the foundation for the subsequent generation of a set of actions 114. Each result corresponds to a specific action. In some embodiments, the set of actions 114 includes adjustments or modifications to be applied to the user input 102. For example, the set of actions 114 includes one or more of the following as applied to the user input 102: append, prepend, discard, allow, sanitize, anonymize, modify. The set of actions 114, in some embodiments, only modifies a portion of the user input 102.

In some embodiments, the egress web gateway 106 applies the set of actions 114 to the user input 102. The application of the set of actions 114, in some embodiments, involves manipulations of the input based on the prescribed actions, such as anonymization of sensitive information or syntactic restructuring.

In some embodiments, the set of actions 114 includes pattern recognition techniques to modify the user input 102 while maintaining contextual relevance for a more precise response by the generative AI API 108. For example, a user submits a query "I'm struggling to research the generative AI market.' Any ideas of what the trends are looking like? I can't find any." In the scenario, the egress web gateway 106 employs the modification capabilities based on the results of pattern recognition. Recognizing that the central focus of the input pertains to finding trends for the generative AI market, the gateway employs a modification action to remove non-essential contextual parts. In the above example, the modified user input is streamlined to "generative AI market trends," eliminating extraneous details about the user's researching struggles. The modification is guided by predetermined criteria aimed at maintaining a concise and focused communication channel with the generative AI API 108. By removing non-essential information, the egress web gateway optimizes the user input 102 for more efficient and contextually relevant interactions, enhancing the precision of the generative AI API's 108 response and overall user experience.

Figure 2:
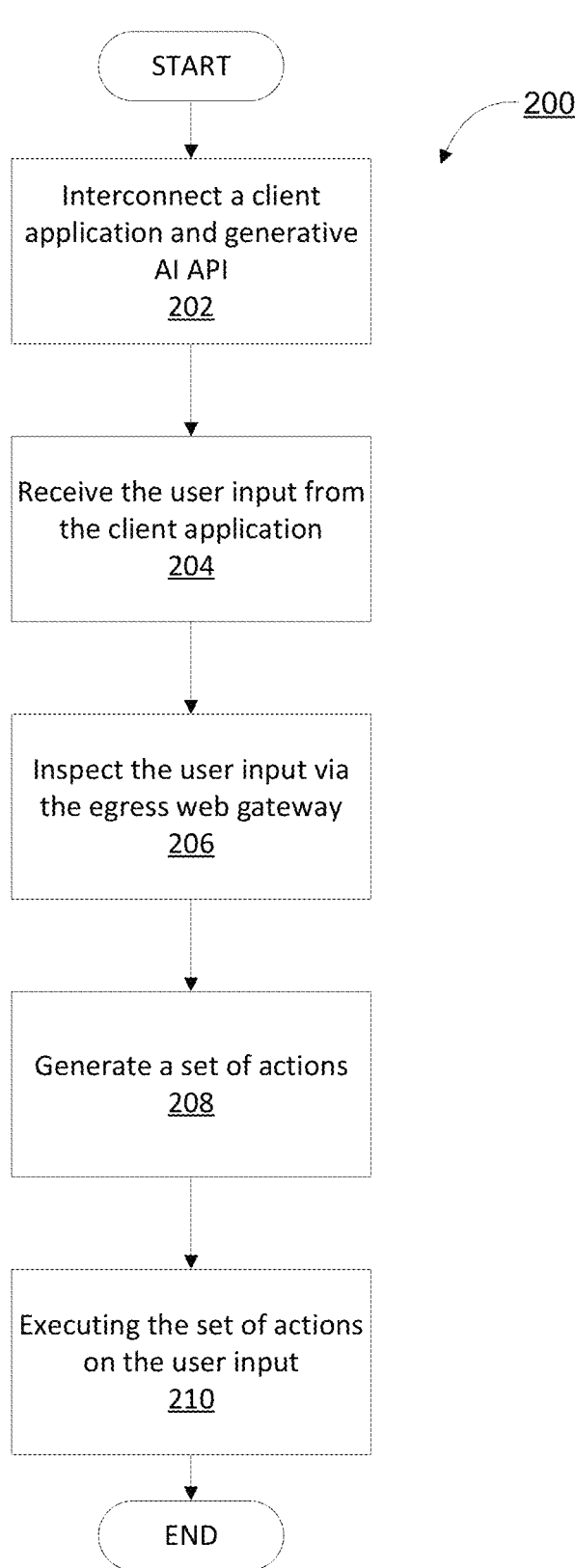
FIG. 2 is a flowchart illustrating a method for controlling access to a generative artificial intelligence (AI) API through a web gateway.

FIG. 2 is a flowchart illustrating a method 200 for controlling access to a generative artificial intelligence (AI) API through a web gateway.

In step 202, the egress web gateway connects a client application and the generative AI API. The egress web gateway is equipped with mechanisms for inspecting and revising communications between the client application and the generative AI API.

Upon receiving the user input from users of the client application in step 204, the egress web gateway inspects the user input to assess the degree of satisfaction against a set of predetermined criteria in step 206. The inspection generates a set of results, with each result mapping to a predetermined action. The egress web gateway turns the set of results into a set of actions tailored to the specific conditions identified during the inspection in step 208. In some embodiments, the set of actions adjusts the user input so that the user input satisfies the predetermined criteria. For more discussion on the inspection of the user input, see FIG. 1.

In step 210, the execution phase involves the egress web gateway applying the set of actions to the user input. The execution, in some embodiments, includes tasks such as anonymizing or removing sensitive information, modifying command format, or triggering specific behaviors based on the predetermined criteria. The egress web gateway acts as a gatekeeper between the client application and the generative AI API to ensure that the user input is aligned with the requirements of the generative AI API and the organization's predetermined criteria before the egress web gateway proceeds for further processing.

Figure 3:
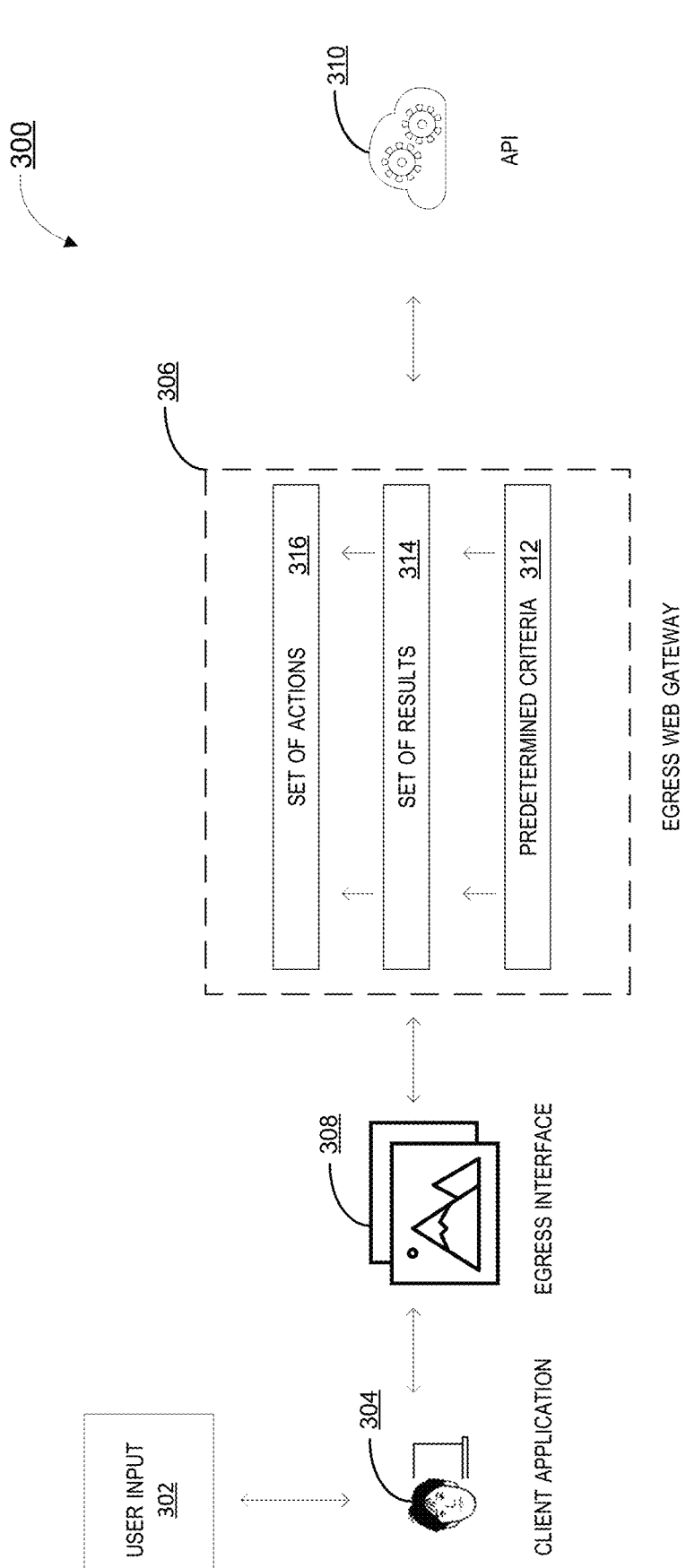
FIG. 3 is a diagram illustrating one embodiment of the egress web gateway as applied to an egress interface.

FIG. 3 is a diagram illustrating one embodiment of the egress web gateway 300 as applied to an egress interface.

Similarly to FIG. 1, the operational flow is initiated by the transmission of user input 302 from the client application 304 to the egress web gateway 306. However, unlike FIG. 1, the user is redirected to an egress interface 308 when attempting to access the generative AI API 310 since the egress web gateway 306 intercepts the user input 302. The egress interface 308, in some embodiments, is a webpage that replaces the interface of the generative AI API. The egress interface 308 serves a dual purpose: first, the egress interface 308 redirects users of the egress web gateway 306 to the egress interface 308 when attempting to access the generative AI API 310; and second, the egress interface 308 is configured to emulate the user interface of the generative AI API 310. The redirection mechanism is triggered in response to attempts to access the generative AI API 310, ensuring that users are seamlessly directed to an interface that replicates the user interface of the generative AI API 310. The redirection provides a familiar interface while still maintaining control and inspection capabilities through the egress web gateway 306.

In some embodiments, the user input is a prompt (e.g., command set or instruction set) to be input in a generative AI API 310 (e.g., "What does API stand for?"). User input 302 constitutes the information provided by users through the client application 304. The user input 302, in some embodiments, is a broad range of data, including but not limited to: textual queries, voice commands, image descriptions, or any other form of interaction initiated by users. The egress web gateway 306 acts as a point where the user input 302 is intercepted and subsequently processed. The egress web gateway 306, in some embodiments, operates as a plugin to interconnect the client application 304, the egress interface 308, and the generative AI API 310, discussed further in FIG. 1.

Upon receiving the user input from the client application, the egress web gateway 306 inspects the user input 302 using a predetermined set of criteria 312. The predetermined set of criteria 312, in some embodiments, is designed to scrutinize various aspects of the user input, such as syntactic, semantic, or contextual attributes. The predetermined set of criteria 312, in some embodiments, assesses satisfaction of the user input 302 with specified standards, to ensure the appropriateness of the user input 302 for downstream processing. In some embodiments, the downstream processing is consuming a generative AI API 310. User inputs 302, in some embodiments, undergo feature extraction or semantic analysis, allowing the system to discern contextual elements and adjust the user input 302 based on the predetermined set of criteria 312. In the case of voice-based user input 302, in some embodiments, advanced natural language processing

8

(NLP) algorithms are first employed on the user input 302 to transcribe and analyze spoken words.

As further discussed in FIG. 1, the set of results 314, generated from the inspection of the user input 102 against the predetermined set of criteria 312, catalogs the degree of adherence of the user input to the predetermined set of criteria 312.

In some embodiments, the egress web gateway 306 applies the set of actions 316 to the user input 302. The application of the set of actions 316, in some embodiments, involves manipulations of the input based on the prescribed actions, such as anonymization of sensitive information or syntactic restructuring.

Figure 4:
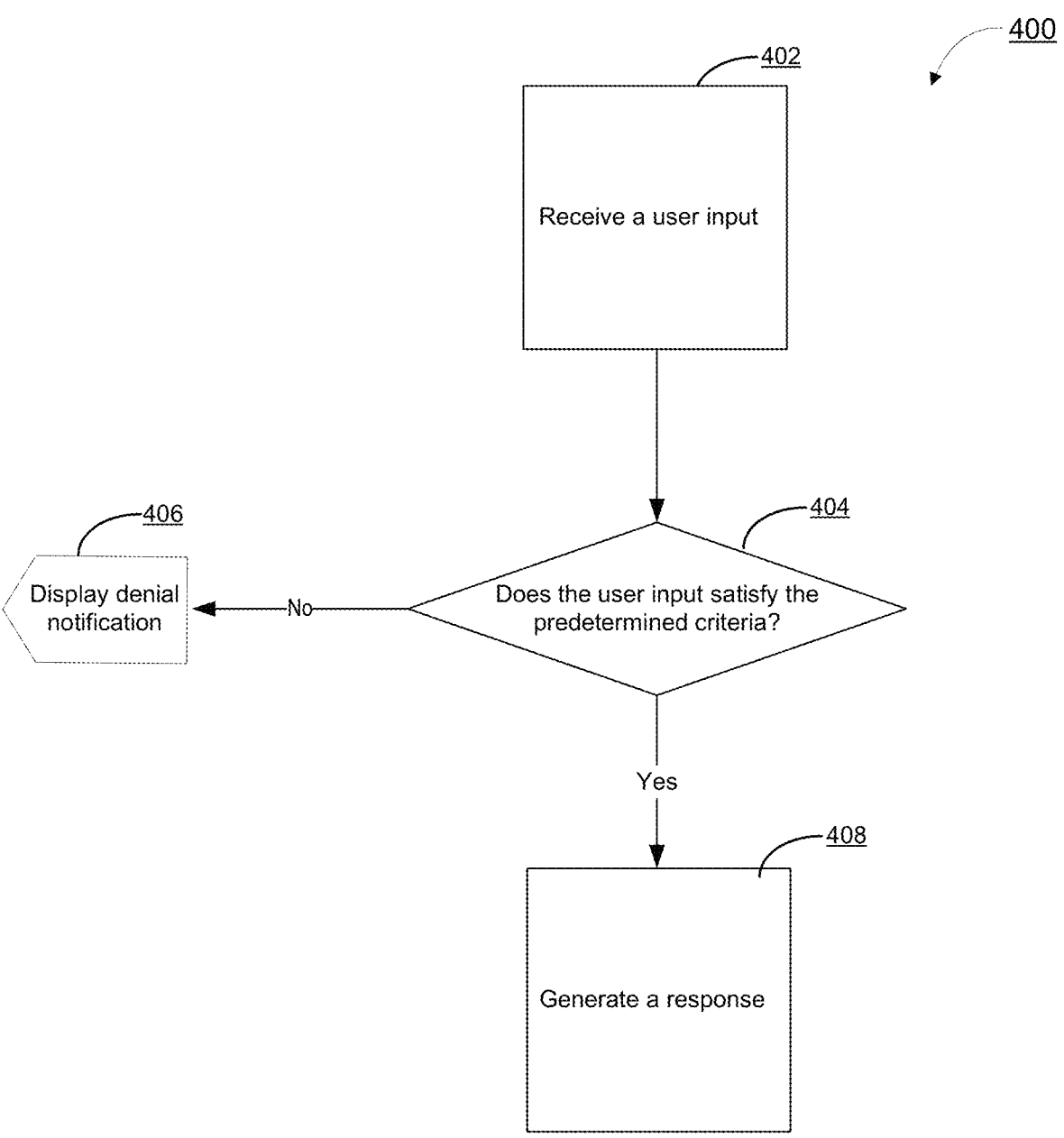
FIG. 4 is a diagram illustrating one embodiment of the egress web gateway as applied to generating a response and a denial notification.

FIG. 4 is a diagram illustrating one embodiment of the egress web gateway 400 as applied to generating a response and a denial notification.

At step 402, the client application receives a user input. For example, the user input is "Analyze the attached proprietary data set for Company X for strategic insights. Identify the valuation of Company X to share in a presentation with the executive team," with an attached Excel spreadsheet containing sensitive information.

The egress web gateway, at step 404, then determines if the user input satisfies the predetermined criteria. For example, the predetermined criteria are that a user input with any sensitive company information must be denied from the generative AI API. In that case, the egress web gateway recognizes terms such as "proprietary" and "Company X," and flags the user input as containing sensitive data. In another example, the predetermined criteria is that any information concerning Company X must not be input into the generative AI API. In that case, the egress web gateway would recognize and flag the user input as non-allowable due to the mention of "Company X."

In some embodiments, the egress web gateway is equipped with document inspection capabilities to ensure a more comprehensive evaluation of user inputs. Step 404 would extend beyond inspecting just the textual queries to include any attachments to assess the potential sensitivity. In some embodiments, the document inspection involves parsing the attached documents. In some embodiments, document inspections use chunking techniques to break up large content into smaller, more manageable pieces. The egress web gateway, in some embodiments, employs a document database or other predefined criteria to identify whether the attachments contain proprietary information or otherwise fall within a category of documents that should not be sent to the generative AI API. In some embodiments, the egress web gateway employs machine learning algorithms to continuously update the document database by refining the ability to discern sensitive information over time.

In some embodiments, document inspection includes detecting specific file formats, such as those commonly associated with proprietary documents or confidential information. The egress web gateway, in some embodiments, uses the file headers, document content, or extensions to compare with known databases of file headers, document content, or extensions in an attempt to verify that the attachment does not contain sensitive information. If the inspection determines that the attached document fails the predefined criteria and indicates sensitivity or a proprietary nature, the egress web gateway takes appropriate actions, such as notifying the user, applying redaction techniques, or blocking the document from being processed by the generative AI API.

In Step 406, in response to determining that a user input does not satisfy the predetermined criteria, the egress web gateway, in some embodiments, graphically displays a denial notification to the user of the client application. In some embodiments, once non-allowed content is detected, a denial notification is triggered, utilizing an event-driven architecture.

In some embodiments, the denial notification is dynamically generated, providing specific details about the nature of the violation, or the content that triggered the denial. The denial notification, in some embodiments, includes error codes, timestamps, or contextual information for diagnostic purposes. In some embodiments, simultaneously, the system logs the incident in a secure audit trail, ensuring a comprehensive record of unauthorized inputs for further analysis and compliance monitoring.

To enhance user understanding, in some embodiments, the denial notification employs natural language processing to articulate the reason for the denial in a user-friendly manner. In some embodiments, a denial is accompanied by educational or corrective measures. The notification, in some embodiments, includes guidance on appropriate query formulation to ensure that users are informed about system constraints and ethical usage standards. For example, rather than stating "Error," the denial notification will state "Sorry, the query contains confidential information. Please remove the confidential information and try again." The denial notification is then delivered to the user interface, using secure communication channels to prevent interception by unauthorized parties. The approach not only fortifies the security of the system but also contributes to a transparent and user-aware interaction environment.

In step 408, in response to determining that a user input satisfies the predetermined criteria, the egress web gateway, in some embodiments, employs the generative AI API to generate a response. In some embodiments, the response corresponds with the user input.

The generation of the response from the generative AI model, in some embodiments, is directed by query context. Query context includes both the query to the generative AI model (e.g., the user input) along with the query's contextual information. The query's contextual information controls the manner in which the queries should be interpreted. For example, the query's contextual information includes temporal factors that consider the timing and sequence of queries to ensure that the information in the user input is okay to be input into the generative AI API, or if the user input is considered to contain confidential information due to the timing. In some embodiments, factors such as demographics and geographical location allow the egress web gateway to restrict users based on where they are or who they are. For example, the query context will prevent certain political topics from being discussed by restricting users from receiving a response.

In some embodiments, the query context is hidden from the user. The hidden parameter, while not explicitly specified in user input, enables the model to produce content that adheres to the specific pre-determined model-driven conditions. In some embodiments, the hidden parameter functions in the same way as a pre-defined query context. Both the pre-defined query context and the hidden parameter guide the generated responses based on predetermined model-driven conditions. In some embodiments, the hidden parameter is pre-loaded into the generative AI API and directs the generative AI API to adhere to the hidden parameter when generating the response.

In some embodiments, the hidden parameter modifies the user input. Modification of the user input includes altering the user input, such as but not limited to: appending, prepending, removing, or adding content within the user input. For example, a user input is "Calculate earnings for account #123456 based on the following data: . . . ," where the account number is deemed sensitive information. To address the sensitive information, a hidden parameter such as "MASK_ACCOUNT_NUM=true" is introduced. Subsequently, the system modifies the user input by applying the parameter, resulting in a transformed query: "Calculate earnings for account #MASKED_ACCOUNT based on the following data: . . . " The modified input preserves the user's intent while safeguarding sensitive information.

In some embodiments, the hidden parameter allows the egress web gateway to restrict access to the generative AI API from the user of the client application based on various factors, such as the user's role. For example, the egress web gateway pre-loads a hidden parameter into the generative AI API, designed to determine the level of access and the type of content recommendations the user is authorized to receive. As the user's input is transmitted through the egress web gateway, the hidden parameter is automatically appended to the user input based on the user's role or status on the platform, with values indicating the type of content the response should contain. For instance, a regular user might have a user role set to "standard," while a content moderator might have the user role set to "moderator." The generative AI API, upon receiving the request with the hidden parameter, tailors the content generation process according to the user's role. For example, a standard user might receive general content recommendations, while a moderator receives suggestions related to content moderation tools or guidelines. In the example, the hidden parameter effectively controls API access by influencing the generative AI's behavior based on the user's role.

In some embodiments, the hidden parameter is designed to enforce content guidelines, including the prohibition or removal of requests that potentially results in generating pornography or other explicit content. The hidden parameter, in some embodiments, employs content analysis to detect and filter out requests that could lead to the generation of inappropriate or explicit material. For example, the egress web gateway implements pattern recognition algorithms to identify keywords, phrases, or structures commonly associated with explicit content. In some embodiments, the hidden parameter references a database of known explicit content patterns. The egress web gateway, in some embodiments, continuously updates the database through machine learning processes to adapt to evolving patterns of speech. If a user input triggers these patterns during the inspection, the egress web gateway takes predefined actions, such as removing explicit content, blocking the request, or notifying the user about content restrictions. Additionally, the hidden parameter, in some embodiments, uses external databases or third-party services that specialize in content categorization to enhance the ability to identify and filter explicit material.

In some embodiments, the hidden parameter allows the users to receive more tailored responses from the generative AI API. For example, a user input is received from a user wishing to create digital artwork. The egress web gateway pre-loads a hidden parameter into the generative AI API. In the example, the hidden parameter directs the generative AI API to adhere to specific stylistic elements during the generation of the response. The user, through the client application, provides a user input specifying their desire for digital artwork with a modern and vibrant style. The egress web gateway intercepts the input and pre-loads the hidden parameter with values indicating a preference for modern and vibrant artistic styles. Thus, as the generative AI API generates the response, the hidden parameter guides the AI model to tailor the generation process according to the specified style preference. The generative AI, directed by the pre-loaded hidden parameter, then generates a response in the form of a digital artwork characterized by modern and vibrant artistic elements.

For example, a hidden parameter is directing the generative AI API to respond in French. When a user inputs a query such as, "What is gravity?" the generative AI API will respond with "La gravité est une force qui attire deux objects l'un vers l'autre." Thus, the user can input a query in English, but receive French responses. In some embodiments, the hidden parameter prepends or appends a list of messages to add to every user input received 402. In the example, the list of messages would direct the generative AI API to respond only in French. On the user's side, however, only a limited amount of information is needed (e.g., the user does not need to specify "reply in French" every time.

For example, a hidden parameter directs the generative AI API to prepend or append a message to "not respond with any explicit words or profanity." Alternatively, to protect confidentiality, a hidden parameter directs the generative AI API to prepend or append a message to "not respond with any employee IDs."

Figure 5:
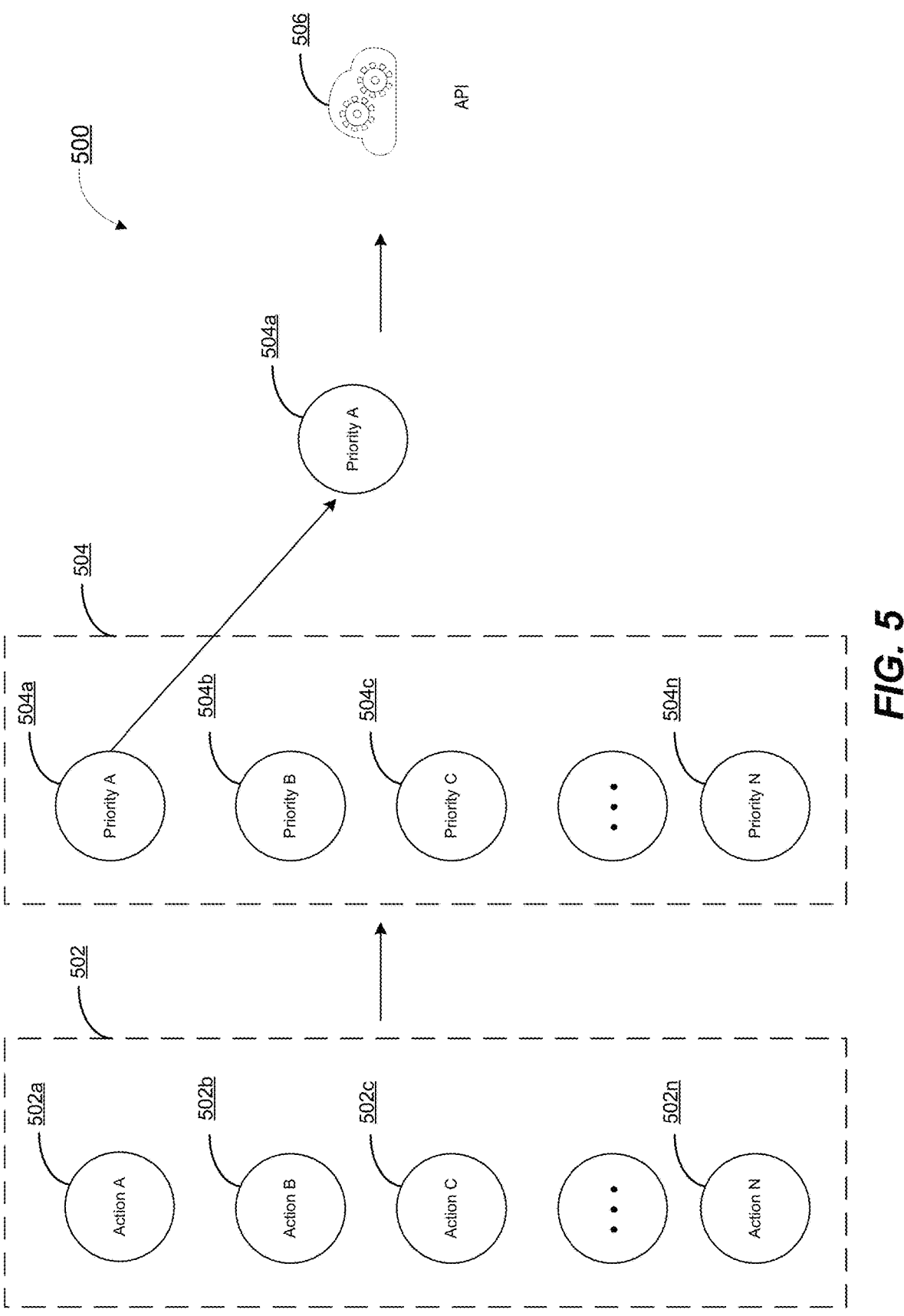
FIG. 5 is a diagram illustrating one embodiment of the egress web gateway as applied to a prioritization system.

FIG. 5 is a diagram illustrating one embodiment of the egress web gateway 500 as applied to a prioritization system.

In some embodiments, the execution of the set of actions 502 is guided by a prioritization system. The set of actions 502, in some embodiments, includes a plurality of actions, 502a, 502b, and so on through 502n, for a total of n actions, where n equals the number of actions. Each action within the set of actions 502 encapsulates specific operations or modifications intended for the user input. In some embodiments, the set of actions 502 undergoes an evaluation by the prioritization system, which employs predefined priority parameters.

The predefined priority parameters, in some embodiments, involve factors such as security risk, compliance requirements, or strategic importance. As the prioritization system operates, the system yields a prioritized set of actions 504, where each action is assigned a specific priority level. The prioritized set of actions 504, in some embodiments, includes a plurality of prioritized actions, 504a, 504b, and so on through 504n, for a total of n prioritized actions, where n equals the number of prioritized actions. Each prioritized action within the set of prioritized actions 504 encapsulates specific operations or modifications intended for the user input, with 504a representing the highest-prioritized action based on the established parameters. For example, the set of actions 502 includes ALLOW, DENY, and MODIFY (as applied to the user input). If the predefined priority parameters state that DENY must be prioritized above MODIFY, which must be prioritized above ALLOW, the prioritized actions 504 according to the predefined priority parameters would be DENY, MODIFY, ALLOW, with DENY being the most prioritized action.

The egress web gateway, in some embodiments, is structured to interpret and implement the prioritized actions and modify the user input accordingly. Specifically, the egress web gateway directs the attention first to the highest-prioritized action, 504a, which signifies the task of utmost importance within the set. Continuing with the above example, the DENY action is the highest-prioritized action. In some embodiments, the egress web gateway performs multiple prioritized actions, stopping when impractical to continue. For example, if the set of actions 502 is APPEND, PREPEND, ALLOW, the egress web gateway would perform the APPEND and PREPEND actions since both can be performed without interfering with the purpose of the other.

Figure 6A:
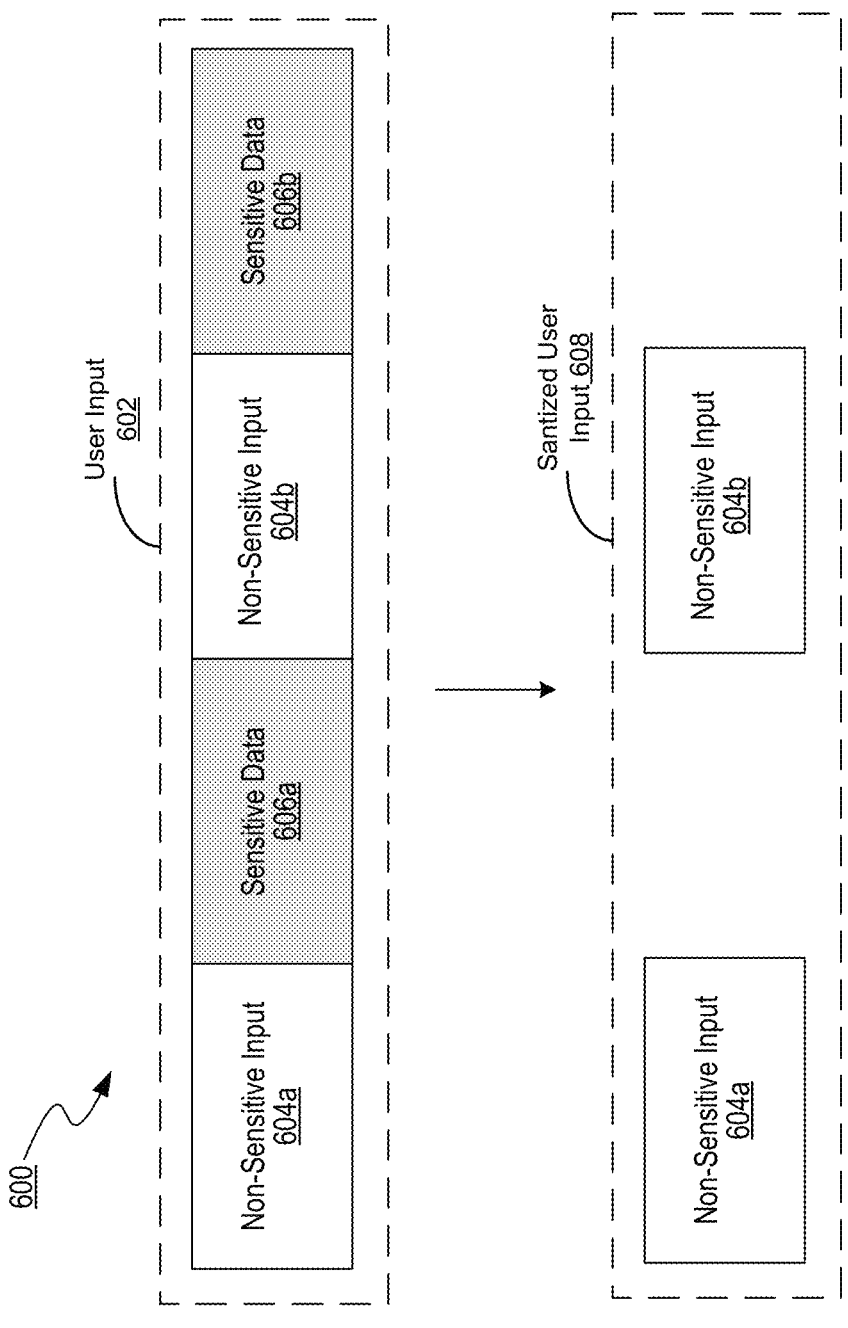
FIG. 6A is a diagram illustrating one embodiment of the egress web gateway as applied to removing sensitive data from the user input via the egress web gateway.

FIG. 6A is a diagram illustrating one embodiment of the egress web gateway 600 as applied to removing sensitive data from the user input via the egress web gateway.

In some embodiments, the user input 602 includes both non-sensitive input, 604a and 604b, and sensitive data, 606a and 606b. In some embodiments, the egress web gateway employs a content analysis mechanism to discern between the two categories, recognizing specific patterns, keywords, or formats indicative of sensitive information. In some embodiments, the list of indicators of sensitive information is generated by a generative AI model (e.g., with a command set that resembles "generate a plurality of examples of PII"). The generative AI model is trained on a dataset containing examples of sensitive data elements, such as personally identifiable information (PII), financial records, or other confidential information. Once the AI model has been trained, the AI model generates indicators (e.g., specific patterns, keywords, or formats) of sensitive information based on the model's learned associations.

Once generated, the list of indicators enables heuristic comparisons and/or evaluations via comparatively simple, non-generative AI models to the list of indicators and potential PII dataset. By using a generative AI model to generate a list of indicators but then not employing the generative AI to perform the actual comparisons, no generative AI is able to train on the potential PII data.

In some embodiments, through the utilization of pre-trained models and contextual analysis, the egress web gateway identifies specific patterns, keywords, or formats that serve as indicators of sensitive information. In some embodiments, the content analysis mechanism operates in real-time, dynamically adjusting the recognition criteria based on evolving patterns and emerging threat vectors. The process involves the extraction of semantic meaning from the user input, allowing the gateway to categorize information based on contextual relevance and potential sensitivity. For instance, the mechanism recognizes patterns associated with personally identifiable information (PII), sensitive keywords, or predefined data formats aligning with confidential information. The analysis enables the egress web gateway to make informed decisions about the nature of the content.

For instance, within the context of a generative AI application focused on customer support, the egress web gateway 600 employs pattern recognition to identify keywords or phrases indicative of sensitive information. If a user inputs a query such as "I forgot my password, can you help me reset it?" the gateway's algorithmic pattern recognition module would detect keywords like "forgot," "password," and "reset." Recognizing these patterns, the gateway understands that the user is seeking assistance with password recovery. Based on predetermined criteria, the set of actions generated might include additional security measures, such as triggering a multi-factor authentication process before allowing access to password-reset functionalities. Pattern recognition not only ensures the security of user interactions but also tailors the response to the specific context of the user's query.

For example, a user input for a simple calculation is "Calculate employee tax bracket with salary adjustments: Employee ID 1356—Astarion Ancunin, $80,000 to $85,000; Employee ID 1111—Gale Dekarios, $95,000 to $100,000." In the example, the egress web gateway, through content analysis, recognizes that the user input contains both non-sensitive information, such as the salary numbers needed for the calculations, and sensitive data, specifically the employee names and IDs. In the example, the content analysis mechanism identifies the sensitive data 606*a* and 606*b* related to employee names and IDs and generates a sanitized user input that only retains the non-sensitive aspects of the query. Sanitizing the user input ensures that details like salary adjustments are maintained, serving the user's purpose, while sensitive employee identification information is appropriately removed.

Upon the completion of the analysis, the system generates a sanitized user input 608, which exclusively retains the non-sensitive input components, 604*a* and 604*b*. The sanitized user input, therefore, effectively removes any sensitive data, ensuring that only permissible and non-sensitive elements persist in the subsequent processing stages. The sanitization process is crucial for upholding data privacy and compliance with security protocols. For example, using the above user query, a sanitized user input 608 is "Calculate employee tax bracket with salary adjustments: Employee, $80,000 to $85,000; Employee, $95,000 to $100,000." In some embodiments, a combination of any of the described modifications is implemented.

Figure 6B:
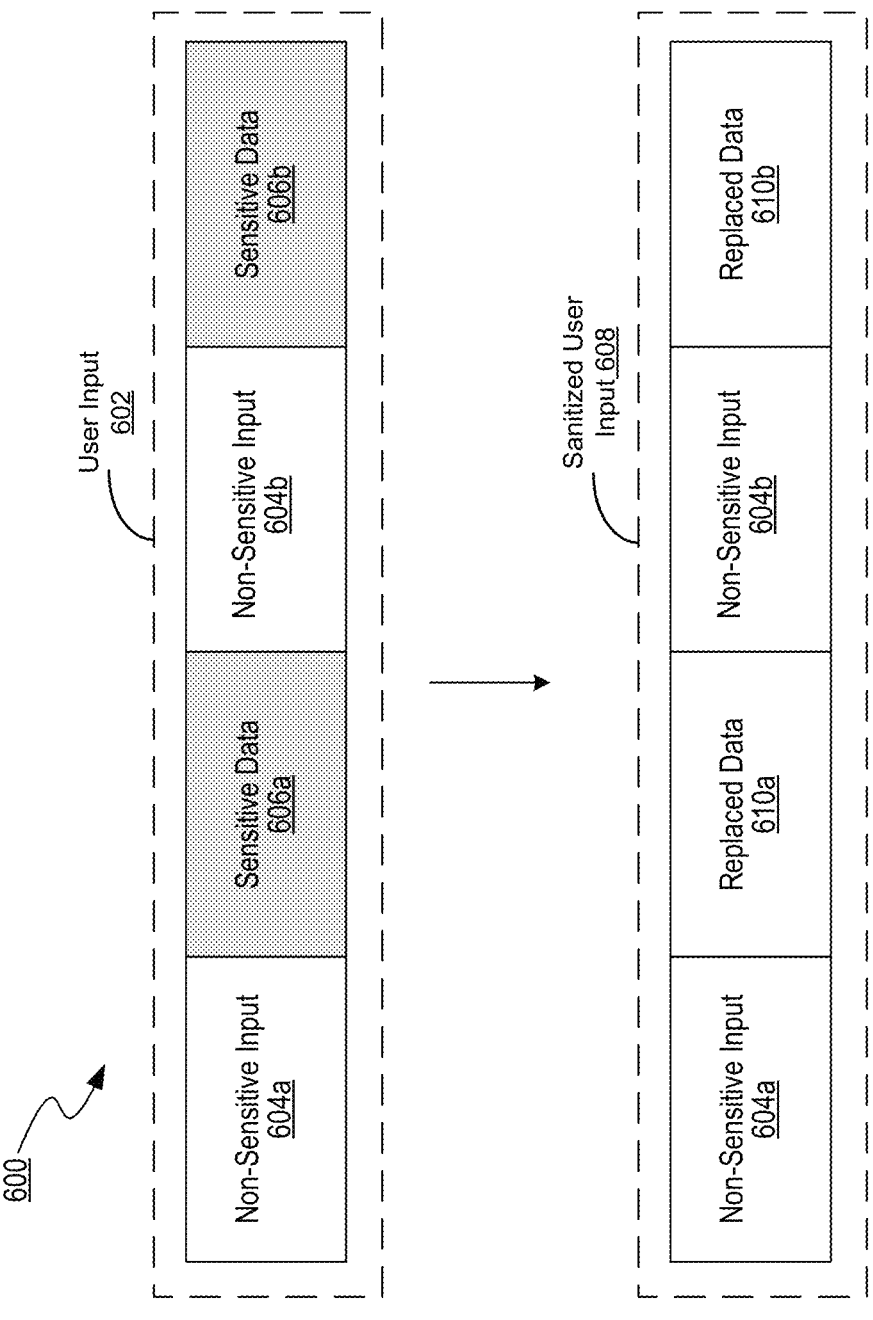
FIG. 6B is a diagram illustrating one embodiment of the egress web gateway as applied to replacing sensitive data from the user input via the egress web gateway.

FIG. 6B is a diagram illustrating one embodiment of the egress web gateway 600 as applied to replacing sensitive data from the user input via the egress web gateway.

In some embodiments, rather than outright removing sensitive data 606*a* and 606*b* during content analysis, the egress web gateway takes a different approach by replacing the sensitive data 606*a* with pseudonymous or dummy data. The technique is employed to maintain the structure and context of the user input while mitigating the risk associated with handling sensitive details. The replacement process involves generating artificial or placeholder data that resembles the original information in terms of format but lacks actual identifying content.

For instance, using the above example in FIG. 6A, the sanitized user input 608 would be "Calculate employee tax bracket with salary adjustments: Employee ID 1234-John Doe, $80,000 to $85,000; Employee ID 5678-Jane Smith, $95,000 to $100,000." In the example, instead of removing the salary information entirely, the system replaces the salary information with replaced data 610*a* and 610*b* (e.g., "1234," "5678," "John Doe," "Jane Smith"), maintaining the structure of the input while safeguarding sensitive data 606*a* and 606*b*. The approach serves a dual purpose of preserving the context of the user's request and adhering to privacy standards. The approach ensures that the user input remains meaningful and actionable while prioritizing data protection through the incorporation of pseudonymous data in the sanitized output. In some embodiments, the egress web gateway removes some portions and replaces other portions of the user input.

Figure 7:
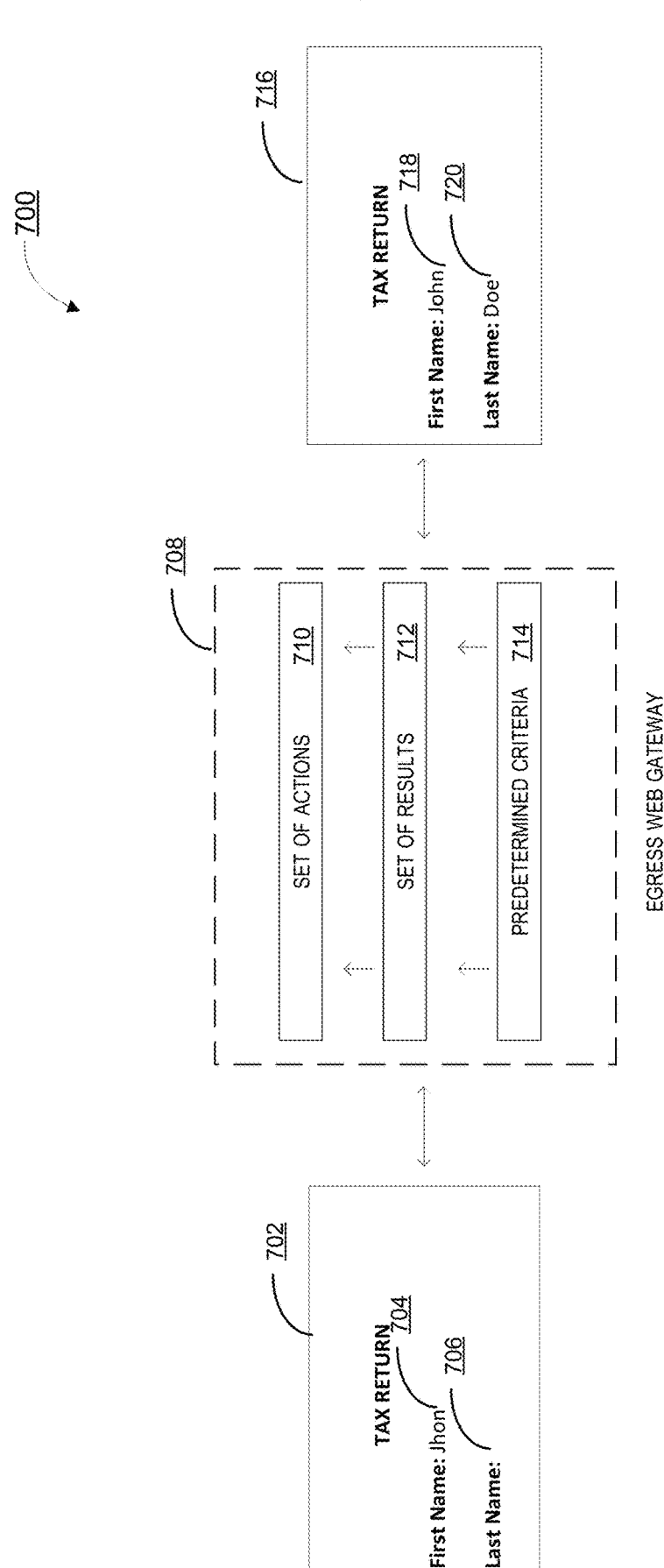
FIG. 7 is a diagram illustrating one embodiment of the egress web gateway as applied to a response and request transformer.

FIG. 7 is a diagram illustrating one embodiment of the egress web gateway as applied to a response and request transformer 700. A request or response 702 including content 704 and 706 is monitored by the gateway 708.

In some embodiments, once the response or request 702 is set to transit through the egress web gateway 708, a generative AI model directed by a command set triggers evaluations of the response or request 702. The command set (e.g., "Identify any typos or inconsistencies and correct them") allows for dynamic revisions to the response or request 702 (e.g., identifying typos or inconsistencies with the content 704 and 706 while parsing through the content 704 and 706 and correcting them). In some embodiments, the generative AI model predicts the consecutive string of characters in content 704 and 706 based on patterns within the training set. The generative AI model corrects the content 704 and 706 through recognizing a deviation from typical language usage within the context the response/request.

In some embodiments, the generative AI model learns to predict the next character in a sequence and feed the extended sequence back into the generative AI model to predict the following character. Given a sequence of characters, the generative AI model generates a probability distribution over all possible characters for the next position, and then selects the character with the highest probability as the prediction for the next character in the sequence. When encountering an input sequence, the model calculates the probability of the observed sequence occurring naturally in the training data. Anomalies are identified when the calculated probability falls below a certain threshold, which indicates that the sequence is unlikely to be typical or expected. Once an anomaly is recognized, in some embodiments, the egress web gateway 708 automatically takes remedial action by transforming the anomaly to the predicted character.

In some embodiments, the generative AI model generates a confidence score of the likelihood of observed anomalies in the response or request 702. If the confidence score falls below a certain threshold, the input sequence is passed to a user for further analysis. In some embodiments, the generative AI model has configurable parameters and settings that allow users to adjust the generative AI model's sensitivity to different types of anomalies. Configurable thresholds are set to determine the level of confidence required for the generative AI model to flag and/or fix an anomaly, which allows users to balance between false positives and false negatives according to their tolerance levels. For example, an organization that operates in a high-risk environment where even a slight chance of a false negative results in severe consequences decides to lower the threshold to flag potential threats with slightly less confidence but reduce the risk of overlooking critical incidents.

In some embodiments, once the response or request 702 is set to transit through the egress web gateway 708, the egress web gateway 708 inspects the response or request 702 based on satisfaction with predetermined criteria 714. The criteria 714 encompasses pre-set or automatically generated parameters such as data format, content, and compliance standards. The egress web gateway 708 detects the inconsistency or consistency of the content 704 and 706 with the criteria 714 in the set of results 712. Then, if the content 704 and 706 is inconsistent, the egress web gateway 708 automatically implements a set of actions 710 to align the response or request 702 with the criteria 714. The egress web gateway 708 will compare the content 704 and 706 to the criteria 714 again, and repeat this loop until the content 704 and 706 aligns with the criteria 714.

In some embodiments, the egress web gateway 708 uses configuration files that specify the rules, conditions, or transformations to be applied to incoming requests and/or responses 702. The configuration files, in some embodiments, are manually created, generated by the gateway management system, predefined by the organization, or predefined based on industry regulations. In some embodiments, the egress web gateway 708 dynamically retrieves criteria from external sources or services during runtime. For example, the egress web gateway 708 queries external databases, APIs, or services to fetch validation rules or reference data based on the context of the incoming request or response 702.

For example, in the case of a request transformer 700, an API request such as a submission of a tax return or purchase of an airline ticket is monitored to ensure that essential fields for compliance, such as a correct first name and last name, are accurately provided. In the example, the content 704 and 706 of a request includes a misspelled field 704 (e.g., first name) and a field left blank 706 (e.g., last name). The criteria 710 requires the first name and last name to be filled in correctly. Then, in the case of a misspelled field 704, the request transformer 700 applies corrective measures to re-spell the field correctly by accessing a user profile database containing the correct spelling of the user's name. Similarly, if a blank field 706 is detected, the request transformer 700 populates the blank field 706 with relevant information (e.g., the correct last name queried from a user profile database). In some embodiments, the request transformer 700 recognizes the misspelling of the first name (J-o-h-n misspelled as J-h-o-n) by calculating the probability of "Jhon" occurring in the given context. If "Jhon" is an uncommon sequence of characters or has a low probability of occurring naturally in the training data, the sequence is flagged as an anomaly. Thus, the generative AI model transforms "Jhon" to "John" to align the content 704 to the predicted content. Similarly, the request transformer 700 recognizes a blank field by predicting a high probability of a certain character based on the surrounding context, but observing no characters. The generative AI model transforms the blank field by filling in the relevant information (e.g., last name "Doe").

For example, in the case of a response transformer 700, a client requests order confirmation details from an e-commerce platform. The response 702 typically includes content 704 and 706 such as the order ID, item details, shipping address, and payment status. However, in instances where the response contains errors or omits information due to system glitches or other external factors, the response transformer 700 modifies the response 702 from the application to align the response 702 with predetermined criteria 710. If any critical information, such as the shipping/billing address or payment status, is missing or incomplete, the transformer populates these fields with the appropriate data retrieved from the e-commerce platform's database to ensure that the customer has an accurate representation of the order details for later reference. In some embodiments, the response transformer 700 recognizes the omission by calculating the probability of the observed response given the context of order confirmation details. If the absence of the shipping address deviates from expected patterns in the training data, the omission is flagged as an anomaly and filled in according to the predicted content.

Figure 8:
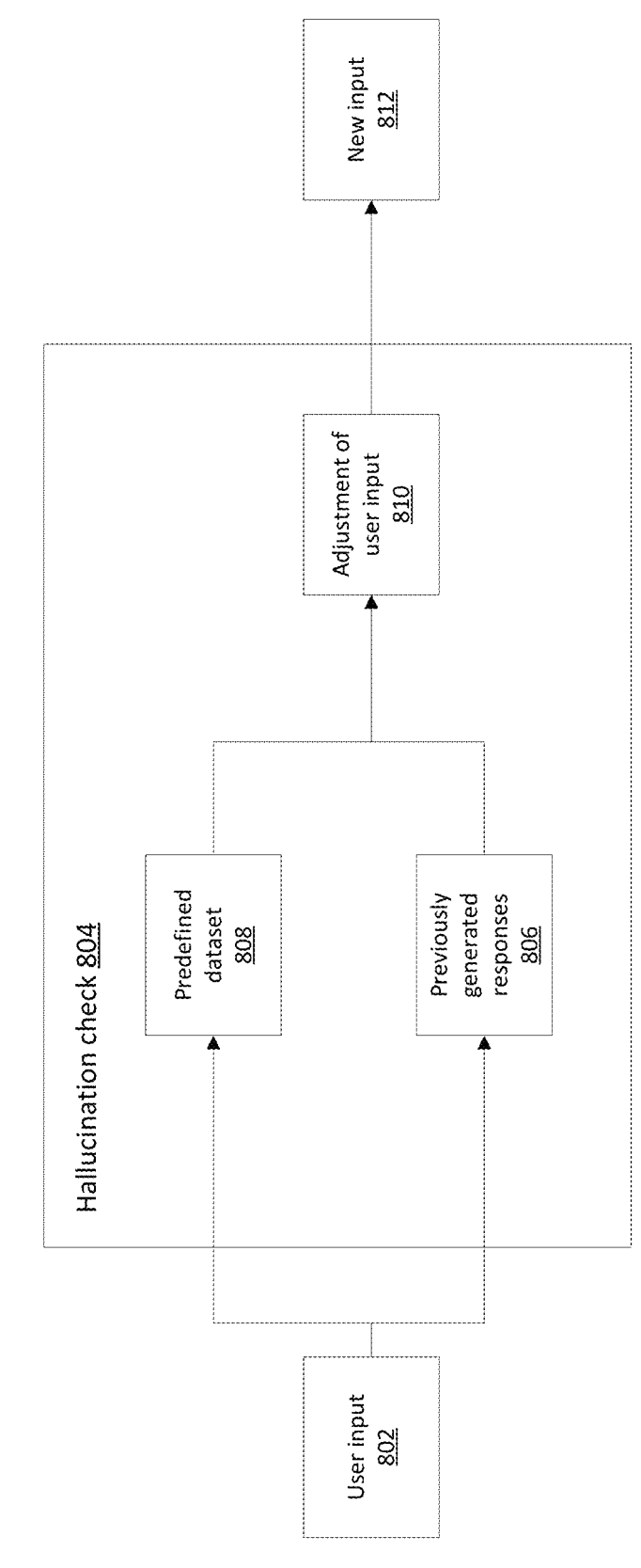
FIG. 8 is a diagram illustrating one embodiment of the egress web gateway as applied to a hallucination check.

FIG. 8 is a diagram illustrating one embodiment of the egress web gateway 800 as applied to a hallucination check.

When the user input 802 enters the hallucination check 804 within the egress web gateway, in some embodiments, a comparison is initiated against the predefined dataset 808 and previously generated responses 806. The algorithms within the hallucination check conduct statistical analyses to assess the probability of false data generation.

A hallucination check is meant to assess and mitigate the potential generation of false or hallucinated data by the generative AI API. The hallucination check systematically evaluates the likelihood of the generative AI API producing inaccurate outputs by conducting a comparison against a predefined dataset 808 of inputs. The dataset serves as a reference point to enable the hallucination check to quantitatively assess the credibility of the generative AI's responses. In some embodiments, the hallucination check extends to referencing previously generated responses 806 from the generative AI API, augmenting the evaluative criteria from a historical perspective. In some embodiments, only one of the comparisons is made (e.g., only to a predefined dataset 808 or only to the previously generated responses 806).

The hallucination check module utilizes a combination of sophisticated algorithms to assess and adjust user inputs, enhancing the reliability of the generative AI API.

In some embodiments, the hallucination check employs statistical analysis algorithms to quantitatively evaluate the likelihood of false data generation. The algorithms utilize statistical measures, such as probability distributions and significance testing, to analyze the user input 802 against the predefined dataset 808 or previously generated responses 806. Through significance testing, the algorithms assess whether observed variations are likely to have occurred by random chance or if the observed variations represent meaningful deviations. In some embodiments, Bayesian statistical methods allow the system to update the probability estimates iteratively as more data becomes available. In some embodiments, the hallucination check incorporates machine learning models, such as supervised learning classifiers, to discern patterns indicative of false data within the generative AI responses. The models are designed to recognize nuances and deviations that might signify inaccuracies.

In some embodiments, the hallucination check relies on advanced pattern recognition techniques, including natural language processing (NLP) algorithms, to analyze textual data within the user input and generated responses. NLP algorithms identify semantic structures, syntactic patterns, and linguistic anomalies that indicate the presence of hallucinated content.

In some embodiments, the hallucination check uses a dynamic adjustment process that involves iterative algorithms that systematically modify the user input based on the insights gained from the hallucination check. These algorithms iteratively refine the input to reduce the likelihood of false data generation. In some embodiments, techniques such as gradient descent or evolutionary algorithms are employed to optimize the adjustments. Gradient descent operates by iteratively moving towards the minimum of a cost or loss function. In the context of the hallucination check, the technique is applied to adjust the user input parameters in a direction that minimizes the likelihood of false data generation. By continuously updating the input in the direction of the steepest decrease in the calculated error or risk associated with hallucinations, the system refines the user input in a targeted manner. Evolutionary algorithms generate diverse variations of the input, selecting those that yield lower probabilities of false data generation, and iteratively refining the input over successive generations.

Subsequently, the adjustment process 810 utilizes advanced algorithms to iteratively refine the user input in real time based on the insights gleaned from the hallucination check. The resulting new input 812 represents a refined version, designed to enhance the reliability of the input data forwarded to the generative AI API.

Figure 9:
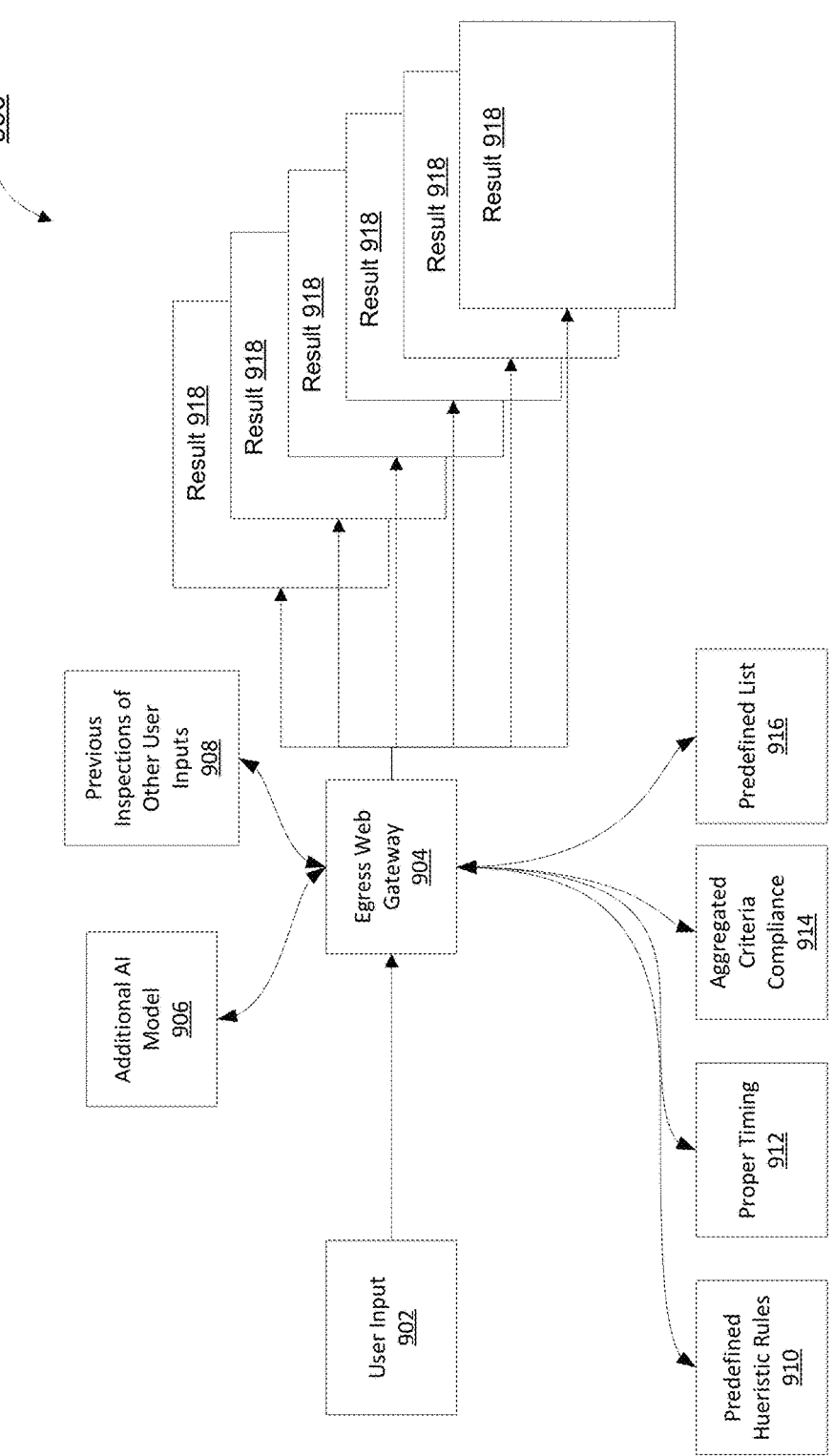
FIG. 9 is a diagram illustrating one embodiment of the egress web gateway as applied to criteria verification.

FIG. 9 is a diagram illustrating one embodiment of the egress web gateway 900 as applied to criteria verification.

The user input 902, within the egress web gateway 904, undergoes an inspection process orchestrated by the egress web gateway 904.

In some embodiments, the egress web gateway 904 uses an additional AI model 906 to inspect the user input 902. In some embodiments, the additional AI model 906 provides a probabilistic evaluation of the user input's coherence and relevance. In some embodiments, the additional AI model

906 uses softmax activation functions for multi-class classification by converting raw output scores into probability distributions between 0 and 1. The approach enhances the model's capability to discern subtle nuances in coherence and relevance.

In some embodiments, the egress web gateway 904 uses previous inspections of other user inputs 908 to inspect the user input 902. The identification of recurring patterns or anomalies, in some embodiments, uses autoregressive integrated moving average (ARIMA) models, to capture the temporal dependencies in the inspection data. ARIMA models forecast future inspection outcomes based on historical patterns, allowing the egress web gateway 904 to anticipate potential security threats by analyzing the sequence of user inputs 902 and inspections. In some embodiments, the egress web gateway 904 uses supervised or unsupervised learning to detect anomalies, such as one-class support vector machines (SVMs) or isolation forests. SVMs (a supervised machine learning algorithm) and isolation forests (an unsupervised machine learning algorithm) focus on identifying instances that deviate significantly from the norm, helping the egress web gateway 904 flag potentially malicious user inputs based on deviations from the expected patterns observed in previous inspections of other user inputs 908.

In some embodiments, the egress web gateway 904 uses predefined heuristic rule 910 to inspect the user input 902. Predefined heuristic rules 910, in some embodiments, is implemented through rule-based systems with regular expressions and syntactic parsers. The predefined heuristic rules 910 systematically compare distinct portions of the user input against specified syntactic and semantic patterns, ensuring a structured and rule-guided approach to the inspection.

In some embodiments, the egress web gateway 904 uses timing rule 912 to inspect the user input 902. The implementation of timing rule 912, in some embodiments, involves the use of temporal logic, where conditions are evaluated based on specific time frames or intervals. For instance, the egress web gateway 904 analyzes the temporal sequence of user inputs 902 to detect patterns that conform or deviate from expected timing constraints. In some embodiments, the egress web gateway 904 employs timestamp information associated with user inputs 902, applying statistical analyses or algorithms to discern temporal patterns. In some embodiments, timing rule 912 involves techniques such as time-series analysis or event sequencing to derive insights into the timing dynamics of user interactions. For example, a piece of information (e.g., Company X looking to acquire Company Y) is confidential before a certain date (e.g., before the acquisition date), and will no longer be confidential after the certain date and thus can be input into the generative AI API.

In some embodiments, the egress web gateway 904 uses aggregated criteria compliance 914 to inspect the user input 902. The quantification of criteria compliance involves the incorporation of fuzzy logic systems. Membership functions in fuzzy logic assign numerical values representing the degree of adherence to each criterion, offering a nuanced and quantitative assessment. In some embodiments, a fuzzy logic system is set up, delineating precise membership functions for each predefined criterion and establishing a rule base that governs the logical relationships between user input 902 characteristics and compliance levels. Subsequently, the fuzzy inference engine is engaged to apply these defined rules and membership functions to the user input to generate fuzzy sets that represent the nuanced degrees of compliance for each criterion. The aggregation process follows, wherein the fuzzy values obtained for individual criteria are aggregated, considering the established rules and membership functions. The subsequent defuzzification step employs methods like centroid or weighted average techniques to convert aggregated fuzzy values into numerical representations. The results in a quantitative assessment of compliance for each criterion. These individual compliance scores are then aggregated, providing an overall compliance level for the entire set of predefined criteria.

In some embodiments, the egress web gateway 904 uses a predefined list 916 to inspect the user input 902. String matching algorithms are used to determine compliance with the predefined list 916. In some embodiments, given predefined permitted or prohibited terms from a predefined list 916, and metrics such as the Levenshtein distance ensure a precise comparison against the predefined list 916. In some embodiments, the predefined list 916 is systematically curated, encompassing specific terms or patterns marked as either permissible or prohibited within the user input 902. The system quantifies the similarity or dissimilarity between the user input 902 and the terms in the predefined list 916. In some embodiments, the minimum number of single-character edits needed to transform one string into another is calculated to enable a detailed comparison. In some embodiments, regular expression matching is employed to scrutinize the user input 902 for patterns aligning with or diverging from the criteria established in the predefined list 916.

In some embodiments, one or more of the described inspection methods are used to inspect user input 902. The inspection by the egress web gateway 904 yields a set of results 918, where each result corresponds to the inspection method(s) used.

Figure 10:
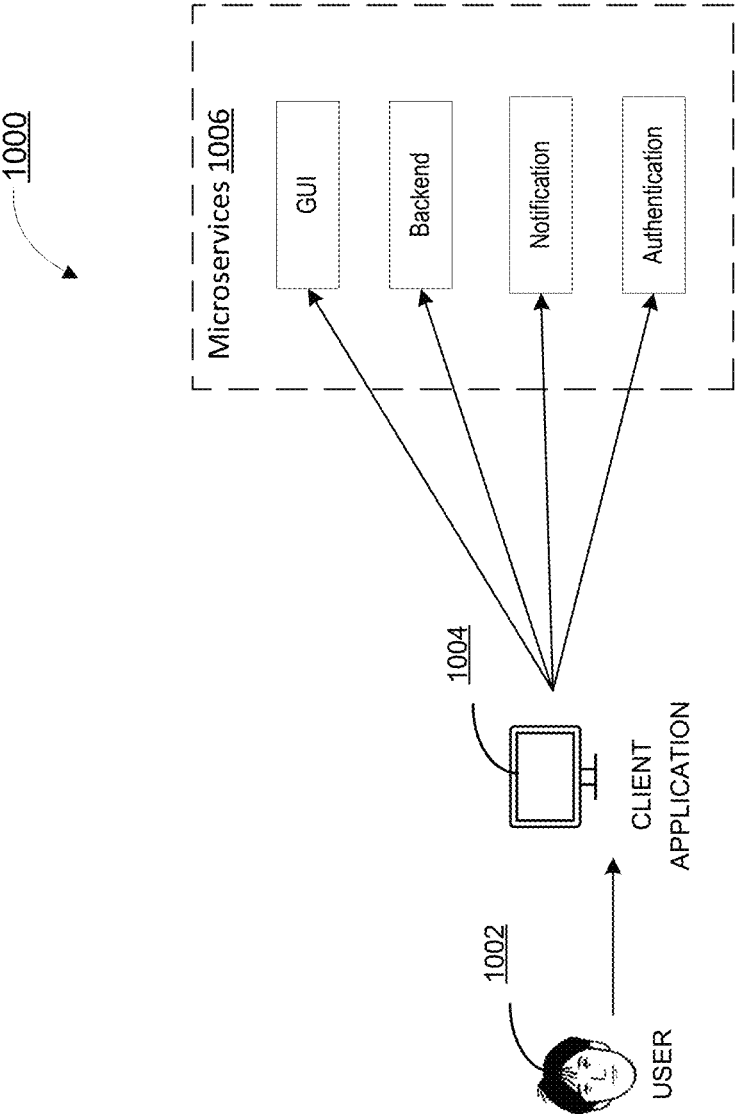
FIG. 10 is a diagram illustrating one embodiment of the egress web gateway as applied to a microservice architecture application.

FIG. 10 is a diagram illustrating one embodiment of the egress web gateway 1000 as applied to being a microservice architecture application.

Microservices are a software development technique-a variant of the service-oriented architecture (SOA) architectural style that structures an application as a collection of loosely coupled services (embodied in APIs). In a microservices architecture, services are fine-grained and the protocols are lightweight. The benefit of decomposing an application into different smaller services is that it improves modularity. This makes the application easier to understand, develop, test, and become more resilient to architecture erosion. Microservices parallelize development by enabling small autonomous teams to develop, deploy and scale their respective services independently. Microservice-based architectures enable continuous delivery and deployment.

Unlike control plane-based API management, which focuses on managing internal APIs and services within the organization, the egress web gateway 1000, in some embodiments, manages exposed endpoints that serve as entry points for external clients to interact with the functionality provided by the microservices (e.g., a generative AI service). For example, the generative AI model service provides an API endpoint that allows clients to submit requests for generating specific types of content, such as images, text, or recommendations.

In some embodiments, the user 1002 interacts with a client application 1004. The client application 1004, in some embodiments, is structured as a microservice application. The microservice application is composed of independently deployable services 1006, each encapsulating specific functionalities. The architecture allows individual services 1006 to be developed, deployed, and scaled independently.

Within the microservice application, in some embodiments, there exists a graphical user interface (GUI) configured to directly receive user input. The GUI serves as the front-end component, providing users with an interactive interface to input the user inputs. Additionally, in some embodiments, the microservice application includes a backend process dedicated to managing requests from client-side components. The backend process serves as the orchestrator, handling communication between different services and processing requests from the user.

In some embodiments, a notification service dynamically generates notifications, ranging from email alerts to in-app messages, based on specific triggers or events within the application. In some embodiments, the notification service supports multiple delivery mechanisms, such as email servers, messaging services, and push notification APIs, ensuring reliable and timely delivery. Users, in some embodiments, are able to customize their notification preferences, defining frequency, preferred channels, and types of notifications they wish to receive.

In some embodiments, an authentication service manages user registration, including account creation, information validation, and secure storage of user credentials. In some embodiments, the service utilizes token-based authentication, such as JSON Web Tokens (JWT), to validate user identity and provides a stateless mechanism for subsequent requests. In some embodiments, the service also uses multifactor authentication (MFA) for added security, enforcing secure password policies, and providing mechanisms for password recovery.

In some embodiments, the user 1002 interacts with the client application 1004, transmitting user input to the egress web gateway. The egress web gateway then performs the inspection and compliance checks on the user input before facilitating communication with the underlying services 1006.

Figure 11:
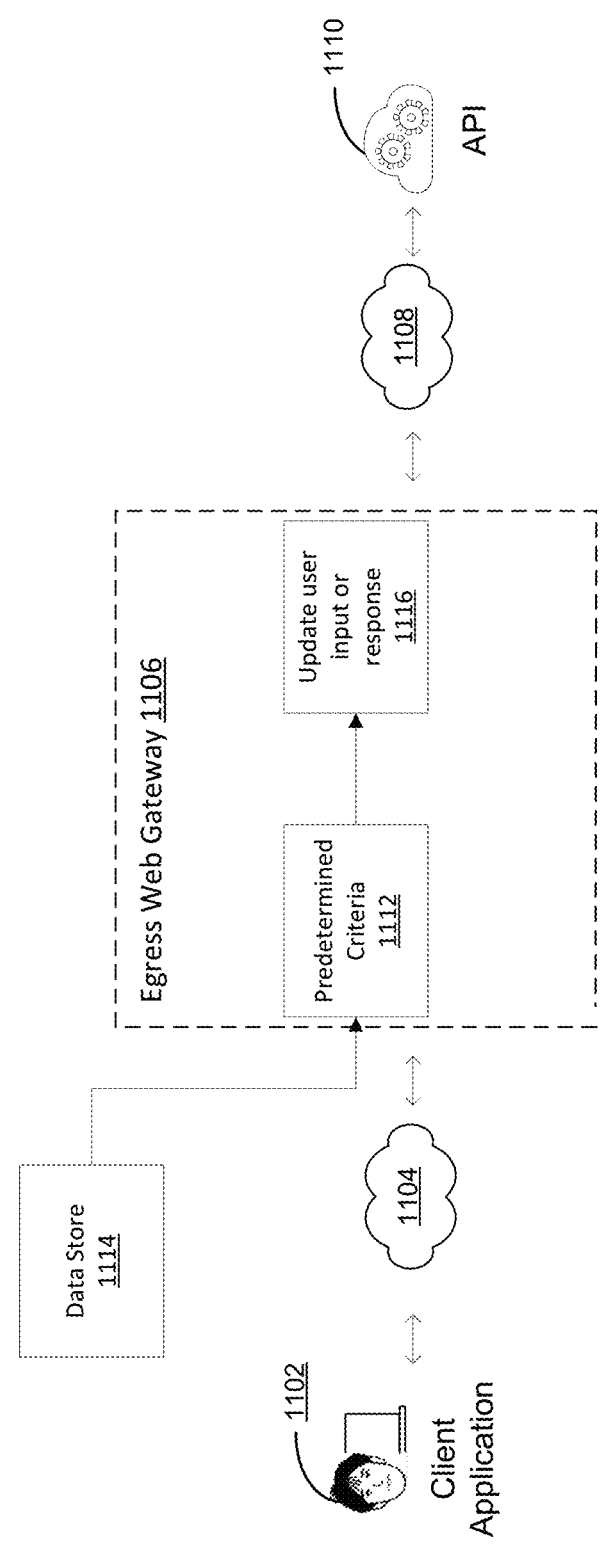
FIG. 11 is a diagram illustrating one embodiment of the egress web gateway as applied to formatting user inputs or upstream API responses.

FIG. 11 is a diagram illustrating one embodiment of the egress web gateway 1100 as applied to formatting user inputs or upstream API responses.

Facilitating communication between a client application 1102 and the generative AI API 1110, the egress web gateway 1106 acts as an intermediary. The communication link between the client application 1102 and the generative AI API, in some embodiments, is created through the egress web gateway 1106. The client application is connected with the egress web gateway 1106 through a first communication link 1104, and the generative AI API 1110 is connected with the egress web gateway 1106 through a second communication link 1108.

The client application 1102 receives user inputs from users of the client application and formatted responses from the generative AI API 1110. In some embodiments, the format of the user inputs from users of the client application and formatted responses from the generative AI API 1110 is associated with the consumption of the generative AI application.

The processor within the egress web gateway 1106, in some embodiments, leverages algorithms for real-time data processing, such as pattern matching and parsing techniques. The processor assesses the user input for compliance with predetermined criteria 1112.

In some embodiments, the egress web gateway 1106 incorporates a data store 1114 housing a set of predetermined criteria 1112. The predetermined criteria 1112 define specific formatting requirements associated with the generative AI API 1110 or the user input from the client application 1102. The data store serves as a repository for the predetermined criteria 1112 that guide the assessment and potential modification of incoming user inputs or responses. In some embodiments, data store 1114 stores all the data, routing information, plugin configurations, etc. Examples of a data store is Apache Cassandra or PostgreSQL.

Upon detecting non-compliance with the predetermined criteria 1112, the user input or response is adjusted 1116. In some embodiments, the adjustment 1116 includes regex-based transformations or binary data manipulation to conform the user input or response precisely to the required format. Regex-based transformations ensure that specific data segments are identified and transformed to adhere to the required format or organizational standards.

For scenarios involving binary data formats, in some embodiments, the adjustment 1116 incorporates binary data manipulation techniques. In some embodiments, the adjustment 1116 includes bit-level operations and byte-order adjustments, tailored to align the structure and content of the user input or response with the predetermined criteria.

In some embodiments, the format of both the user input and the generated response is encapsulated within the metadata associated with the corresponding element. Metadata refers to additional information or descriptors that accompany the user input or response. In some embodiments, metadata includes specifications including, such as, but not limited to data types, encoding schemes, or any other attributes defining the expected structure. When the user input or response is received, the egress web gateway 1106 extracts and evaluates the format details from the metadata. In some embodiments, including the format within the metadata increases the egress web gateway's efficiency in managing and manipulating the communication flow between the client application and generative AI APIs.

For example, a developer desires to localize their API responses to French, from English. Without the need to adjust the code from the client application, the adjustment 1116 automatically translates every API response from the generative AI API 1110 within the existing traffic through dynamic language localization, improving the user experience. Thus, all responses received at the client application 1102 is in French. The egress web gateway 1106 creates new net generative AI API 1110 traffic without the need to build the code from scratch.

Once the adjustment 1116 rectifies any non-compliance with the predetermined criteria, the egress web gateway delivers the modified user input or response to the intended recipient (e.g., the user input is delivered to the generative AI API 1110, the response is delivered to the client application 1102). In some embodiments, the data is packaged based on the expected format and dispatched through the established communication link 1104 or 1108 to either the generative AI API 1110 or the client application 1102, depending on the origin of the data. The egress web gateway enforces formatting standards without intervention from the client application 1102 or the generative AI API 1110.

In some embodiments, the egress web gateway 1106 controls communication between the client application and generative AI APIs 1110 through the utilization of a pre-configured list of approved APIs within the egress web gateway 1106. The pre-configured list acts as a comprehensive whitelist, explicitly specifying which generative AI APIs 1110 are permitted to be accessed by the client application 1102 and limiting access to only those APIs that have been authorized. In some embodiments, the egress web gateway 1106 maintains an internal repository containing details of approved generative AI APIs 1110. In some embodiments, the internal repository includes unique identifiers, endpoint URLs, or other relevant information. When the client application 1102 initiates communication with the egress web gateway 1106, the egress web gateway 1106 checks the target generative AI API 1110 against the pre-configured list. If the API is not present in the approved list, the egress web gateway 1106 denies the communication attempt, blocking access to unapproved APIs.

Figure 12:
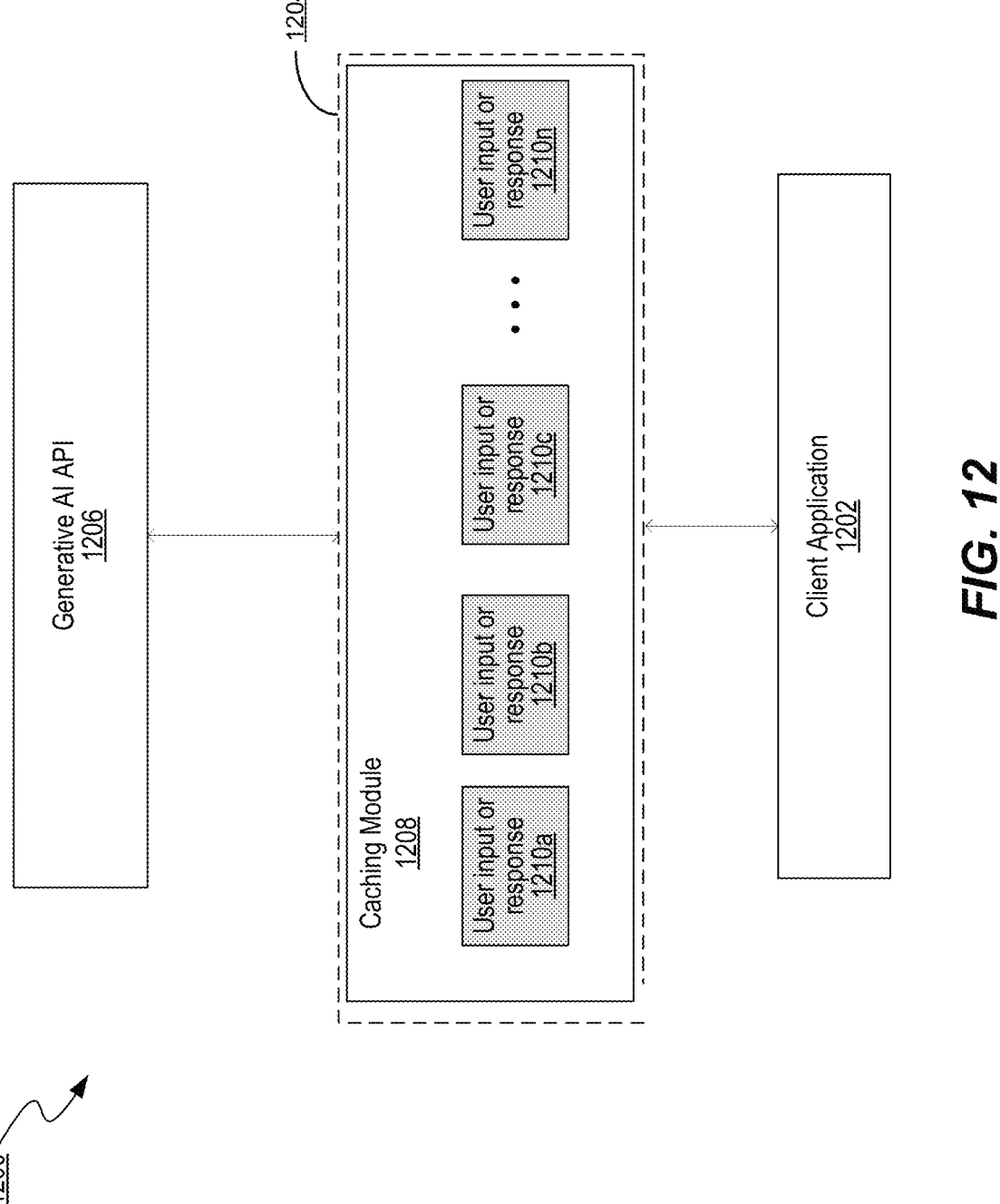
FIG. 12 is a diagram illustrating one embodiment of the egress web gateway as applied to a caching module within the egress web gateway.

FIG. 12 is a diagram illustrating one embodiment of the egress web gateway 1200 as applied to a caching module within the egress web gateway.

In some embodiments, the client application 1202 is connected to a cache 1204 within the egress web gateway. The cache 1204 is also connected to the generative AI API 1206. In some embodiments, a caching module 1208 within the cache 1204 is designed to store and manage previous user inputs or responses 1210 in the cache 1204, which acts as a temporary, dynamic storage mechanism. The previous user inputs or responses 1210, in some embodiments, includes a plurality of previous user inputs or responses 1210, 1110*a*, 1110*b*, and so on through 1110*n*, for a total of n user inputs or responses, where n equals the number of user inputs or responses. In some embodiments, the caching module 1208 distinguishes user inputs from the client application 1202 from the responses from the generative AI API 1206. The caching module 1208 is allocated in different locations, including a dedicated memory space on a host server associated with a specific user, on the user's local device, or in a session-only capacity within the generative AI model's query buffer. In some embodiments, previously user inputs or responses 1210 are removed from the cache 1204 after a predetermined period expires.

In some embodiments, the cache management relies on a dynamic cache replacement policy. The cache replacement policy systematically tracks the usage patterns of stored user inputs or responses 1210, prioritizing the retention of recently accessed elements. The cache replacement policy not only enhances the efficiency of response retrieval but also mitigates the impact of storage limitations. The cache replacement policy dynamically adjusts the items stored in the cache, ensuring a more efficient utilization of available resources and thus reducing latency. In some embodiments, user inputs or responses 1210 that are identified as newer or more frequently accessed are stored in a cache. On the other hand, user inputs or responses 1210 that are older or less frequently accessed are removed from the cache. For example, the cache replacement policy considers the time of creation or last access, providing temporal context for the user inputs or responses 1210. Additionally, in some embodiments, the cache replacement policy assigns different weights or priorities based on specific criteria, such as user preferences or other contextual factors.

In some embodiments, the user interface graphically represents previously generated user inputs or responses 1210 stored within the cache to provide users with a visual representation of past analyses. Within the user interface, in some embodiments, a dedicated section displays a chronological or categorized list of user inputs or responses 1210. In some embodiments, each entry includes relevant details such as the date of generation, the specific query or topic associated with the user inputs or responses 1210, or any user-specified guidelines. Users navigate through the user inputs or responses 1210, selecting and viewing more detailed information. In some embodiments, the previous user inputs or responses 1210 are displayed with phrases that encapsulate the user inputs or responses 1210 (e.g., Employee Tax Calculation). In some embodiments, the egress web gateway utilizes the cache 1204 and caching module 1208 to more efficiently format past entered user inputs or past received responses.

AI Egress Point

Figure 13A:
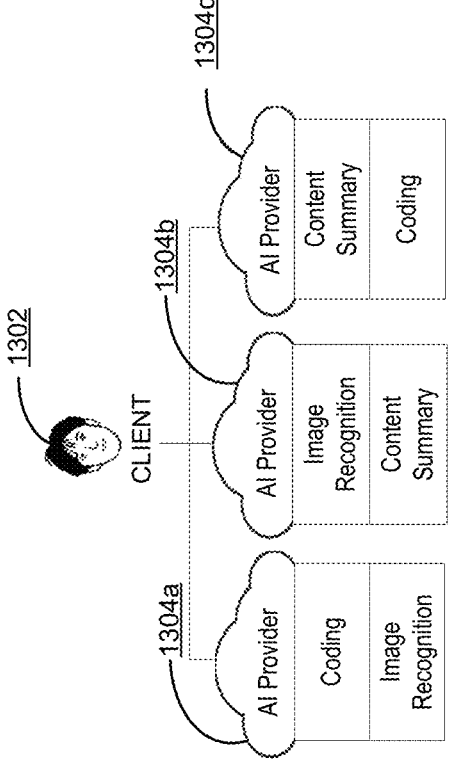
FIG. 13A is a diagram illustrating a prior art approach with multiple generative AI APIs having functionalities common to one another.

FIG. 13A is a diagram illustrating a prior art approach with multiple generative AI providers having different functionalities.

As shown in FIG. 13A, a client 1302 is associated with generative AI providers 1204*a*, 1204*b*, and 1204*c*. Each generative AI provider has a standard set of features or functionalities associated with it. For example, the standard set of functionalities associated with generative AI provider 104A is "coding" and "image recognition." The standard set of functionalities associated with generative AI provider 104B is "image recognition" and "content summary." The standard set of functionalities associated with generative AI provider 104C is "content summary" and "coding." Having different generative AI providers for different functionalities causes inefficiency when attempting to select different AI providers for different tasks or attempting to experiment with different generative AI models (e.g., attempting to see if generative AI provider 1204*a* or generative AI provider 1204*c* is better at coding).

Different generative AI providers 1304 are better suited for different purposes since each generative AI provider 1304 comes with their advantages and different pricing points. For example, a user wants to use the expensive OpenAI model for less frequent—but more complicated-tasks and by default use a cheaper self-hosted open-source model for everything such as Mistral or LLAMA. Additionally, different models are also optimized for different tasks: some AIs are better at coding, some AIs are better at image recognition, and so on.

Figure 13B:
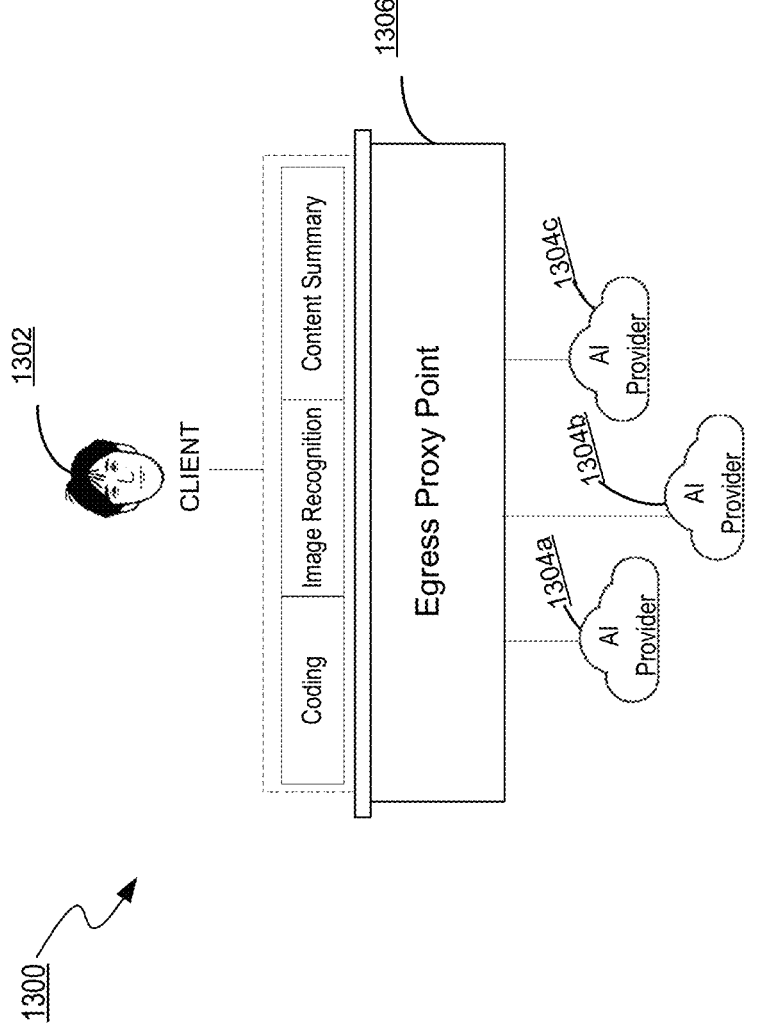
FIG. 13B is a diagram illustrating an egress web gateway, according to an embodiment of the disclosed technology as applied to multiple AI APIs.

FIG. 13B is a diagram illustrating an egress web gateway 1300, according to an embodiment of the disclosed technology as applied to multiple AI providers.

To address the challenge described in connection with FIG. 13A, the disclosed technology provides a distributed AI provider gateway architecture as shown in FIG. 13B. Specifically, disclosed embodiments implement functionalities by bundling the functionalities of the generative AI providers 1304 into an egress proxy point 1306. The egress proxy point 1306 implements the functionalities of any of the generative AI providers 1304 as one set of functionalities that runs in front of generative AI providers 1204*a*, 1204*b*, and 1204*c*. In the example embodiment of FIG. 13B, the set of functionalities includes coding, image recognition, and summary. It will be understood that the above-mentioned core set of functionalities is for examples and illustrations. In some embodiments, there are other functionalities included in the core set of functionalities besides those discussed in FIG. 13B. In some applications, the egress proxy point 1306 helps with rapid experimentation at a reduced complexity. In some embodiments, the different generative AI providers 1304 consumed include a combination of both self-hosted and cloud models. In some embodiments, the generative AI providers 1304 are the same type (e.g., self-hosted v, cloud) of application.

Figure 14:
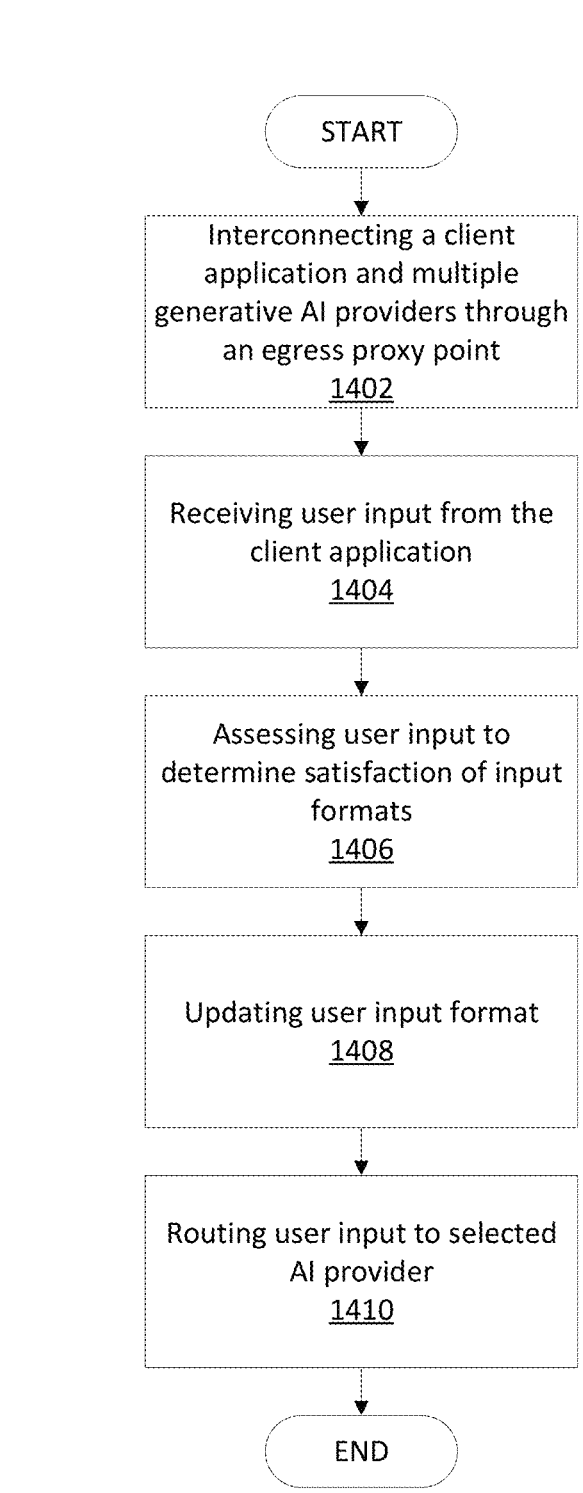
FIG. 14 is a flowchart illustrating a method of the integration of multiple generative AI providers.

FIG. 14 is a flowchart illustrating a method 1400 of the integration of multiple generative AI providers.

The process initiates with step 1402 by interconnecting a client application with multiple generative AI providers through an egress proxy point. In some embodiments, step 1402 employs communication protocols, such as RESTful APIs, to establish the connections between the client application and various AI providers. The integration, in some embodiments, requires the implementation of asynchronous messaging systems or event-driven architectures to optimize real-time interactions. In some embodiments, step 1402 employs authentication methods such as API keys to securely access and interact with the AI providers. Additionally, the communication channels, in some embodiments, are optimized for scalability by employing load-balancing methods and other distributed computing techniques to handle varying workloads to ensure low-latency interactions with the user.

In step 1404, the egress proxy point receives user input from the client application. In some embodiments, the user input is received through any of a session layer (L5), a presentation layer (L6), or an application layer (L7) of an Open Systems Interconnection (OSI) model. The user input not only signifies a user query for the AI model but also designates the selected AI provider from the array of multiple generative AI providers.

In step 1406, the user input is assessed against a set of predetermined criteria. In some embodiments, the format of the user input is verified to be compatible with the command format (e.g., input format) of the selected AI provider. If the formats are not compatible, in some embodiments, in step 1408, the user input undergoes real-time adjustments to align with the input format of the selected AI provider.

In step 1410, the adjusted input is then routed via the egress proxy point to reach the selected AI provider. In some embodiments, the tailored input is routed through any of the layers L5, L6, or L7 of the OSI model. The egress proxy point 1306 allows the client application to adjust the chosen generative AI provider 1304 by modifying the user input to specify a different generative AI provider 1304.

In some embodiments, steps of method 1400 are confined to L7 of the OSI model, the application layer. In some embodiments, in step 1404, a client application is interconnected with multiple AI providers through an egress proxy point. The egress proxy point 1306, in some embodiments, directs and/or monitors the API traffic (e.g., the data and requests that are transmitted between different applications) for multiple AI providers. In some embodiments, the egress proxy point 1306 operates wholly within the application layer L7.

The egress proxy point 1306, in some embodiments, configures specific settings for overriding model names, setting limit thresholds on response sizes, temperature settings (to regulate the randomness or creativity of the selected AI provider's responses), etc., for each of the multiple AI providers. Thus, when the egress proxy point 1306 receives a user input from the client application, the user does not need to modify the input to adhere to specific settings for a selected AI provider. Rather, the user simply inputs the command set and specifies a selected AI provider. The adjustment of the user input is done by the egress proxy point 1306. In other words, the egress proxy point 1306 generates new API traffic without the need for the client application to instruct the selected AI provider from scratch.

The egress proxy point 1306 ensures that the data transmitted aligns with the characteristics of the application layer. In some embodiments, in step 1406, the egress proxy point 1306 performs an assessment of the user input against predetermined criteria to ensure that the user input adheres to the expected structure and semantics defined by the selected AI provider. For example, the criteria compares the response size of the user input to the response size limit for the selected AI provider. In step 1408, adjustments to the user input, in some embodiments, include modifying the user input ensure that the adjusted input aligns with the input format mandated by the selected AI provider. In step 1410, the routing process at the egress proxy point directs the input, through L7, to the selected AI provider.

In some embodiments, the client application's user input is transformed into the format of a first AI provider (e.g., OpenAI), and subsequently sent to the first AI provider. Then, the response from the first AI provider is sent to a backend service. For example, a user wishes to mask out their credit card number, and instead replace the number with asterisks. The egress proxy point would then remove the user's credit card number before sending the user input to the first AI provider. The backend service's response, in some embodiments, is sent to a second AI provider (e.g., LLAMA) and transformed according to the format of the second AI provider. For example, the user wishes for the response to be sent in French. The egress proxy point would then translate the response of the second AI provider to French prior to sending the response to the client application.

In some embodiments, when a different generative AI provider 1304 is specified, the egress proxy point 1306 dynamically adapts to the user's choice by recalibrating to accommodate the requirements of the selected AI provider. In some embodiments, real-time adjustments to the user input occur to conform the user input to the input format specifications of the newly chosen provider. Similarly, the newly adjusted user input is then routed, via the egress proxy point 1306, to the specific AI provider 1304. Translating user input and response formats into the selected AI provider's format, in some embodiments, allows a user to load balance providers later or switch between other AI providers more efficiently.

Figure 15:
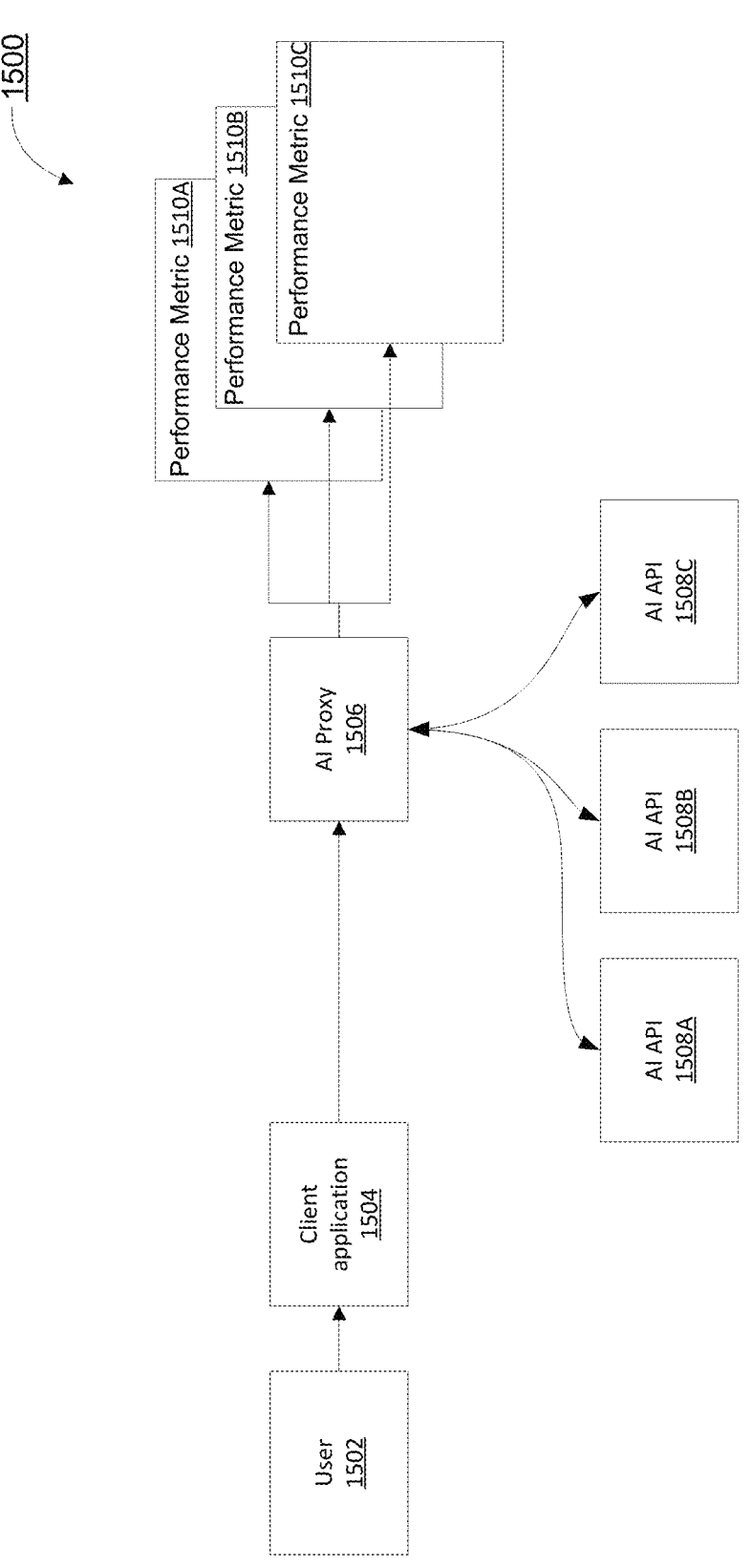
FIG. 15 is a diagram illustrating one embodiment of the integration of multiple generative AI providers as applied to displaying performance metrics.

FIG. 15 is a diagram 1500 illustrating one embodiment of the integration of multiple generative AI providers as applied to displaying performance metrics.

In some circumstances, users 1502 would prefer to view the performance, via the client application 1504, of the various models used to help determine which model would be most optimal to use in the situation. In some embodiments, the AI proxy 1506 incorporates a static or dynamic display of multiple generative AI providers 1508 along with their respective performance metrics. The display feature is integrated into the client application 1504, providing users 1502 with insights into the suitability of each AI provider for processing their input.

In some embodiments, the evaluation of the generative AI providers 1408a, 1408b, and 1408c include a comparison process, wherein the abilities of each generative AI provider are matched against the criteria present in the user input. In some embodiments, the AI proxy 1506 has monitoring and profiling mechanisms in place. In some embodiments, the comparison process involves continuously assessing the performance of each generative AI provider 1408A, 1408B, and 1408C, considering factors such as response time, accuracy, resource utilization, or other relevant metrics. In some embodiments, benchmarking tests or real-time monitoring tools are employed to gather quantitative data on each generative AI provider's 1408A, 1408B, and 1408C capabilities. Benchmarking tests use automated scripts and load-testing tools to simulate diverse user interactions and workloads. Then, the results are analyzed to identify performance trends and inform users 1502 about the suitability of each generative AI provider 1408A, 1408B, and 1408C.

In some embodiments, the process of comparing user input criteria with the abilities of each AI provider includes natural language processing (NLP) algorithms, machine learning models, or rule-based systems that analyze the user input's contextual elements and determine the suitability of each AI provider based on predefined criteria. In some embodiments, the predefined criteria for assessing the suitability of generative AI providers 1408A, 1408B, and 1408C vary based on the nature of the AI applications and user requirements. Examples of predefined criteria to be considered include accuracy, response time, resource utilization, and scalability of generative AI providers 1408A, 1408B, and 1408C.

The client application then dynamically updates the user interface to display the retrieved performance metrics. In some embodiments, the display involves real-time data rendering and potentially leveraging visualization libraries for graphical representation. The interface, in some embodiments, is designed for user-friendly navigation, allowing users to make informed decisions based on the displayed metrics.

The displayed performance metrics 1410a, 1410b, and 1410c corresponding to the generative AI providers 1408a, 1408b, and 1408c, are derived from an evaluation of the generative AI provider's 1408a, 1408b, and 1408c capabilities concerning the specific criteria embedded within the user input. The dynamic display not only empowers users 1502 to make informed choices based on the displayed performance metrics 1410a, 1410b, and 1410c but also contributes to a more transparent and user-centric interaction. The client application 1504 serves as the interface through which users 1502 navigate and select the most suitable generative AI provider for the specific input, thus optimizing the user's 1502 engagement with the generative AI providers 1508 based on real-time performance metrics and criteria comparisons.

Figure 16:
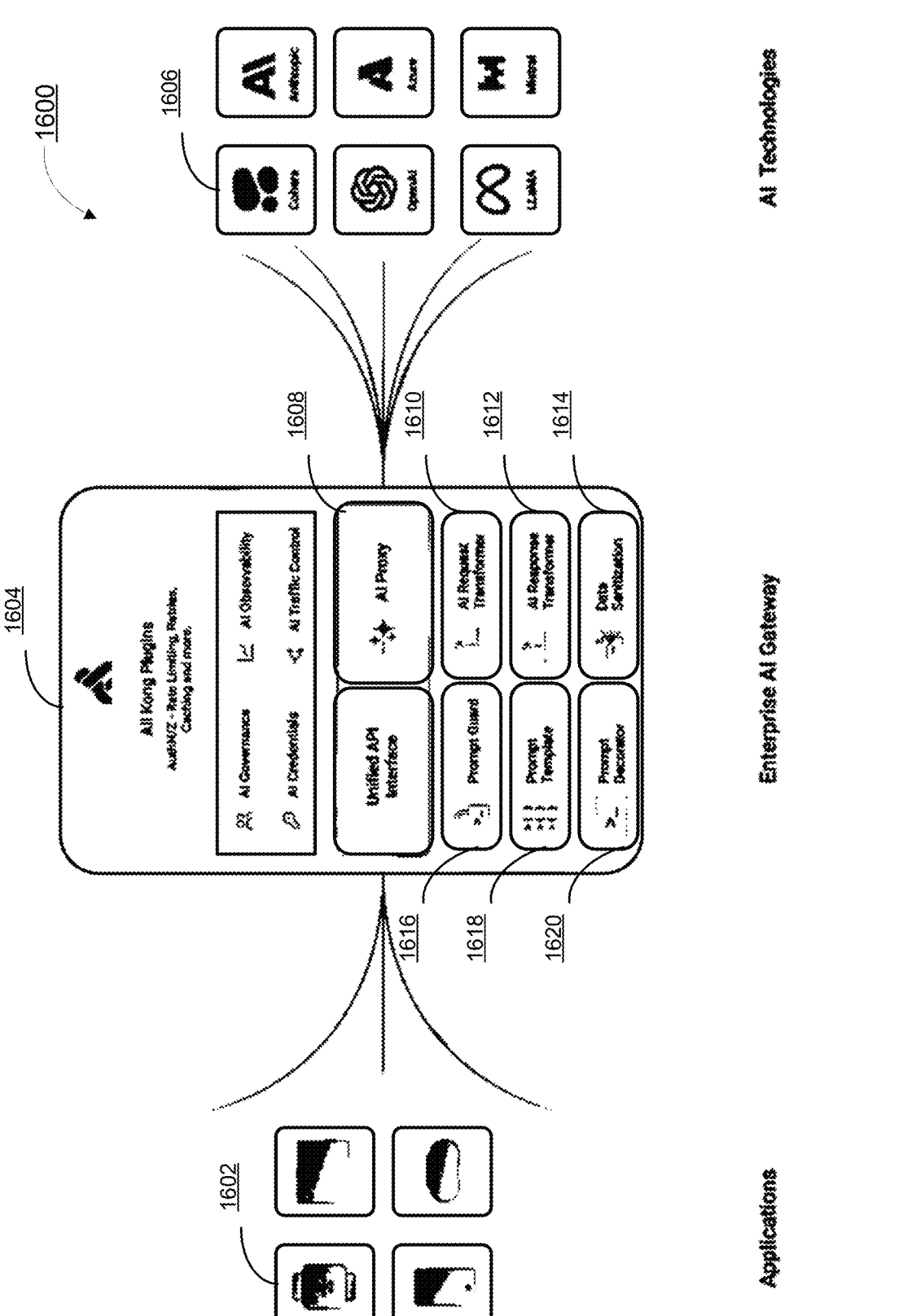
FIG. 16 is a diagram illustrating the architecture of an enterprise AI gateway.

FIG. 16 is a diagram illustrating the architecture 1600 of an enterprise AI gateway. The architecture 1600 includes a framework that orchestrates the interactions between applications 1602, the enterprise AI gateway 1604 (e.g., an egress web gateway), and AI technologies 1606. In some embodiments, applications 1602 include mobile devices, computers, smart watches, virtual reality headsets, etc. in some embodiments, AI technologies 1606 include generative AI applications such as Cohere, Anthropic, OpenAI, Azure, LLAMA, Mistral, etc. in some embodiments, the enterprise AI gateway 1604 is situated between the applications 1602 and the AI technologies 1606, intercepting the user input into the applications 1602 and/or the responses from the AI technologies 1606.

In some embodiments, there is an egress proxy point service 1608 within the enterprise AI gateway 1604. The egress proxy point service 1608 unifies multiple AI technologies 1606, so that the user of the applications 1602 can access different AI technologies 1606 without needing to readjust on their end. The egress proxy point service 1608, in some embodiments, standardizes incoming responses from the AI technologies 1606 or outgoing requests from the applications 1602 into a compatible format, even when there are multiple AI technologies 1606 being used. For more details, see FIGS. 13B and 14.

In some embodiments, there is an AI request transformer service 1610 and an AI response transformer service 1612 within the enterprise AI gateway 1604. In some embodiments, the AI request transformer service 1610 and AI response transformer service 1612 monitors incoming requests and outgoing responses and inspects the incoming request or response, respectively, for the satisfaction of predefined content criteria or standards. Then, the AI request transformer service 1610 and an AI response transformer service 1612 dynamically alter the content of the request or response, respectively, to align with predefined rules or requirements. For more details, see FIG. 7.

In some embodiments, there is a data sanitization service 1614 within the enterprise AI gateway 1604. The data sanitization service 1614 monitors user inputs or responses to ensure that sensitive information undergoes appropriate masking, anonymization, sanitization, or other safeguarding against exposure of confidential details. For more details, see FIGS. 6A and 6B.

In some embodiments, there is a guard service 1616 within the enterprise AI gateway 1604. The guard service 1616 enforces predefined rules and patterns on user inputs by inspecting the user input to the applications 1602 against predetermined criteria. For example, if an employee is attempting to access explicitly blocked material, such as a main Java class (when the employee only has access to child classes), the user is blocked automatically by the guard service 1616 and would not receive a response from the AI technology 1606. For more details, see FIGS. 1-5.

In some embodiments, there is a template service 1618 within the enterprise AI gateway 1604. The template service 1610 facilitates structured prompt engineering by providing a list of predefined prompts for the user of the applications 1602 to choose from.

Prompt engineering is a process of structuring text that is able to be interpreted by a generative AI model. Predefined prompts, in some embodiments, serve as predefined templates or structured queries that already adhere to the expected format and content guidelines of specific AI models within the AI technologies 1606. For example, in some embodiments, a prompt (e.g., command set) includes the following elements: instruction, context, input data, and an output specification.

Although a prompt is a natural-language entity, a number of prompt engineering strategies help structure the prompt in a way that improves the quality of output. For example, in the prompt "Please generate an image of a bear on a bicycle for a children's book illustration," "generate," is the instruction, "for a children's book illustration" is the context, "bears on a bicycle" is the input data, and "an image" is the output specification. The techniques include being precise, specifying context, specifying output parameters, specifying target knowledge domain, and so forth.

Automatic prompt engineering techniques have the ability to, for example, include using a trained large language model (LLM) to generate a plurality of candidate prompts, automatically score the candidates, and select the top candidates.

In some embodiments, prompt engineering includes the automation of a target process—for instance, a prompt causes an AI model to generate computer code, call functions in an API, and so forth. Additionally, in some embodiments, prompt engineering includes automation of the prompt engineering process itself—for example, an automatically generated sequence of cascading prompts, in some embodiments, include sequences of prompts that use tokens from AI model outputs as further instructions, context, inputs, or output specifications for downstream AI models. In some embodiments, prompt engineering includes training techniques for LLMs that generate prompts (e.g., chain-of-thought prompting) and improve cost control (e.g., dynamically setting stop sequences to manage the number of automatically generated candidate prompts, dynamically tuning parameters of prompt generation models or downstream models).

Using predefined prompts generated from prompt engineering streamlines the user experience by aligning user inputs with the nuances of AI APIs and eliminating the need for users of application 1602 to manually ensure format compatibility or align the user input to the predetermined criteria. Users of the application 1602 leverage the predefined prompts to articulate their queries. In some embodiments, a template service 1618 specifies parameters that the user fills out on their own.

In some embodiments, there is a decorator service 1620 within the enterprise AI gateway 1604. The decorator service 1610 is a tool for modifying the user input (e.g., prepending, appending) for streamlining the use of the AI technologies 1606 (e.g., making sure all responses are in French). In some embodiments, the guard service 1616 is able to be deployed after the decorator service 1620 to ensure that a user cannot trick the decorator into executing an action that is not allowed based on the predefined criteria (e.g., for security reasons). For example, a user cannot tell the decorator service 1620 to include employee IDs in all responses, since the guard service 1616 would prevent the AI technology 1606 from doing so. For more details, see FIGS. 1 and 2.

Computing Platform

Figure 17:
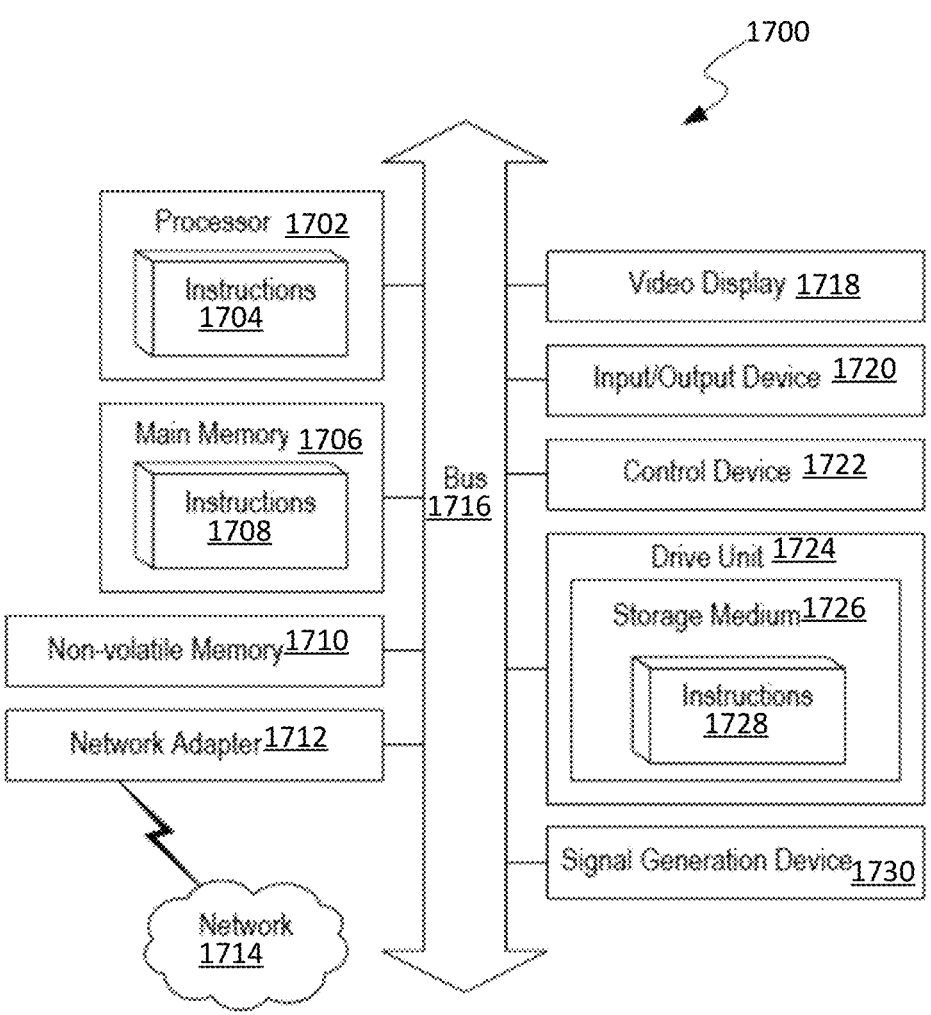
FIG. 17 is a block diagram illustrating an example computer system, in accordance with one or more embodiments.

FIG. 17 is a block diagram illustrating an example computer system 1700, in accordance with one or more embodiments. In some embodiments, components of the example computer system 1700 are used to implement the software platforms described herein. At least some operations described herein can be implemented on the computer system 1700.

In some embodiments, the computer system 1700 includes one or more central processing units ("processors") 1702, main memory 1706, non-volatile memory 1710, network adapters 1712 (e.g., network interface), video displays 1718, input/output devices 1720, control devices 1722 (e.g., keyboard and pointing devices), drive units 1724 including a storage medium 1726, and a signal generation device 1720 that are communicatively connected to a bus 1716. The bus 1716 is illustrated as an abstraction that represents one or more physical buses and/or point-to-point connections that are connected by appropriate bridges, adapters, or controllers. The bus 1716, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1794 bus (also referred to as "Firewire").

In some embodiments, the computer system 1700 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1700.

While the main memory 1706, non-volatile memory 1710, and storage medium 1726 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 1728. The term "machine-readable medium" and "storage medium" shall also be taken to include any medium that is capable of storing, encoding, or carrying a set of instructions for execution by the computer system 1700. In some embodiments, the non-volatile memory 1710 or the storage medium 1726 is a non-transitory, computer-readable storage medium storing computer instructions, which is executable by one or more "processors" 1702 to perform functions of the embodiments disclosed herein.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1704, 1708, 1728) set at various times in various memory and storage devices in a computer device. When read and executed by one or more processors 1702, the instruction(s) cause the computer system 1700 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 1710, floppy and other removable disks, hard disk drives, optical discs (e.g., compact disc read-only memory (CD-ROMS), digital versatile discs (DVDs)), and transmission-type media such as digital and analog communication links.

The network adapter 1712 enables the computer system 1700 to mediate data in a network 1714 with an entity that is external to the computer system 1700 through any communication protocol supported by the computer system 1700 and the external entity. The network adapter 1712 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some embodiments, the network adapter 1712 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 1800 illustrated and described in more detail with reference to FIG. 18.

AI System

Figure 18:
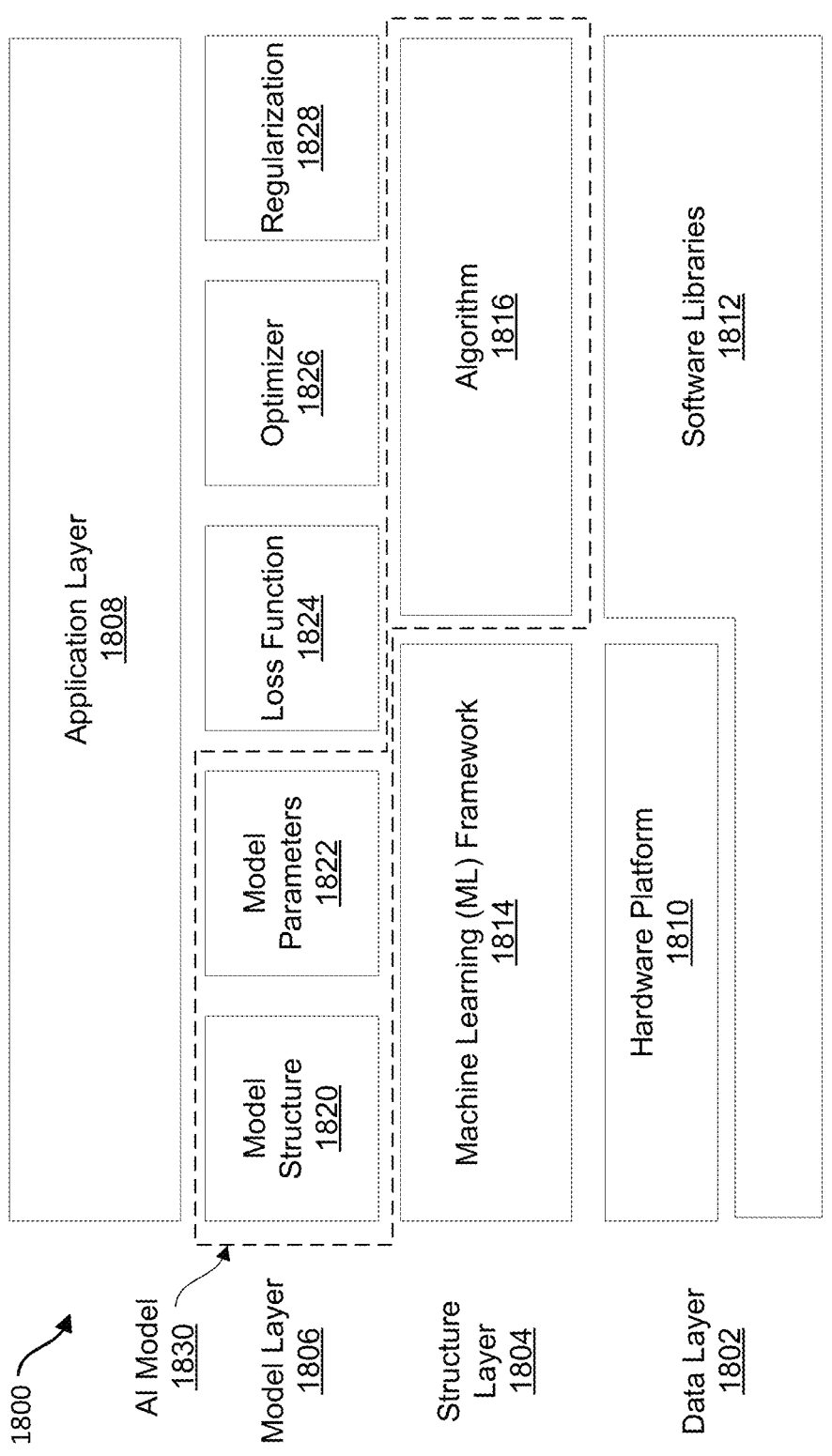
FIG. 18 is a high-level block diagram illustrating an example AI system, in accordance with one or more embodiments.

FIG. 18 is a high-level block diagram illustrating an example AI system, in accordance with one or more embodiments. The AI system 1800 is implemented using components of the example computer system 1800 illustrated and described in more detail with reference to FIG. 17. Likewise, embodiments of the AI system 1800 include different and/or additional components or be connected in different ways.

In some embodiments, as shown in FIG. 18, the AI system 1800 includes a set of layers, which conceptually organize elements within an example network topology for the AI system's architecture to implement a particular AI model 1830. Generally, an AI model 1830 is a computer-executable program implemented by the AI system 1800 that analyses data to make predictions. Information passes through each layer of the AI system 1800 to generate outputs for the AI model 1830. The layers include a data layer 1802, a structure layer 1804, a model layer 1806, and an application layer 1808. The algorithm 1816 of the structure layer 1804 and the model structure 1820 and model parameters 1822 of the model layer 1806 together form the example AI model 1830. The optimizer 1826, loss function engine 1824, and regularization engine 1828 work to refine and optimize the AI model 1830, and the data layer 1802 provides resources and support for the application of the AI model 1830 by the application layer 1808.

The data layer 1802 acts as the foundation of the AI system 1800 by preparing data for the AI model 1830. As shown, in some embodiments, the data layer 1802 includes two sub-layers: a hardware platform 1810 and one or more software libraries 1812. The hardware platform 1810 is designed to perform operations for the AI model 1830 and includes computing resources for storage, memory, logic, and networking, such as the resources described in relation to FIG. 1. The hardware platform 1810 processes amounts of data using one or more servers. The servers can perform backend operations such as matrix calculations, parallel calculations, machine learning (ML) training, and the like. Examples of servers used by the hardware platform 1810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1810 includes Infrastructure as a Service (IaaS) resources, which are computing resources, (e.g., servers, memory, etc.) offered by a cloud services provider. In some embodiments, the hardware platform 1810 includes computer memory for storing data about the AI model 1830, application of the AI model 1830, and training data for the AI model 1830. In some embodiments, the computer memory is a form of random-access memory (RAM), such as dynamic RAM, static RAM, and non-volatile RAM.

In some embodiments, the software libraries 1812 are thought of as suites of data and programming code, including executables, used to control the computing resources of the hardware platform 1810. In some embodiments, the programming code includes low-level primitives (e.g., fundamental language elements) that form the foundation of one or more low-level programming languages, such that servers of the hardware platform 1810 can use the low-level primitives to carry out specific operations. The low-level programming languages do not require much, if any, abstraction from a computing resource's instruction set architecture, allowing them to run quickly with a small memory footprint. Examples of software libraries 1812 that can be included in the AI system 1800 include Intel Math Kernel Library, Nvidia cuDNN, Eigen, and Open BLAS.

In some embodiments, the structure layer 1804 includes an ML framework 1814 and an algorithm 1816. The ML framework 1814 can be thought of as an interface, library, or tool that allows users to build and deploy the AI model 1880. In some embodiments, the ML framework 1814 includes an open-source library, an application programming interface (API), a gradient-boosting library, an ensemble method, and/or a deep learning toolkit that works with the layers of the AI system facilitate development of the AI model 1830. For example, the ML framework 1814 distributes processes for the application or training of the AI model 1830 across multiple resources in the hardware platform 1810. In some embodiments, the ML framework 1814 also includes a set of pre-built components that have the functionality to implement and train the AI model 1830 and allow users to use pre-built functions and classes to construct and train the AI model 1830. Thus, the ML framework 1814 can be used to facilitate data engineering, development, hyperparameter tuning, testing, and training for the AI model 1830. Examples of ML frameworks 1814 that can be used in the AI system 1800 include TensorFlow, PyTorch, Scikit-Learn, Keras, Caffe, LightGBM, Random Forest, and Amazon Web Services.

In some embodiments, the algorithm 1816 is an organized set of computer-executable operations used to generate output data from a set of input data and can be described using pseudocode. In some embodiments, the algorithm 1816 includes complex code that allows the computing resources to learn from new input data and create new/modified outputs based on what was learned. In some implementations, the algorithm 1816 builds the AI model 1830 through being trained while running computing resources of the hardware platform 1810. The training allows the algorithm 1816 to make predictions or decisions without being explicitly programmed to do so. Once trained, the algorithm 1816 runs at the computing resources as part of the AI model 1830 to make predictions or decisions, improve computing resource performance, or perform tasks. The algorithm 1816 is trained using supervised learning, unsupervised learning, semi-supervised learning, and/or reinforcement learning.

The application layer 1808 describes how the AI system 1800 is used to solve problems or perform tasks. In an example implementation, egress web gateway uses the application layer 1808 to intercept communication between the client application 104 and generative AI API 108.

As an example, to train an AI model 1830 that is intended to model human language (also referred to as a language model), the data layer 1802 is a collection of text documents, referred to as a text corpus (or simply referred to as a corpus). The corpus represents a language domain (e.g., a single language), a subject domain (e.g., scientific papers), and/or encompasses another domain or domains, be they larger or smaller than a single language or subject domain. For example, a relatively large, multilingual, and non-subject-specific corpus is created by extracting text from online web pages and/or publicly available social media posts. In some embodiments, data layer 1802 is annotated with ground truth labels (e.g., each data entry in the training dataset is paired with a label), or unlabeled.

Training an AI model 1830 generally involves inputting into an AI model 1830 (e.g., an untrained ML model) data layer 1802 to be processed by the AI model 1830, processing the data layer 1802 using the AI model 1830, collecting the output generated by the AI model 1830 (e.g., based on the inputted training data), and comparing the output to a desired set of target values. If the data layer 1802 is labeled, the desired target values, in some embodiments, are, e.g., the ground truth labels of the data layer 1802. If the data layer 1802 is unlabeled, the desired target value is, in some embodiments, a reconstructed (or otherwise processed) version of the corresponding AI model 1830 input (e.g., in the case of an autoencoder), or is a measure of some target observable effect on the environment (e.g., in the case of a reinforcement learning agent). The parameters of the AI model 1830 are updated based on a difference between the generated output value and the desired target value. For example, if the value outputted by the AI model 1830 is excessively high, the parameters are adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 1830 typically is to minimize a loss function or maximize a reward function.

In some embodiments, the data layer 1802 is a subset of a larger data set. For example, a data set is split into three mutually exclusive subsets: a training set, a validation (or cross-validation) set, and a testing set. The three subsets of data, in some embodiments, are used sequentially during AI model 1830 training. For example, the training set is first used to train one or more ML models, each AI model 1830, e.g., having a particular architecture, having a particular training procedure, being describable by a set of model hyperparameters, and/or otherwise being varied from the other of the one or more ML models. The validation (or cross-validation) set, in some embodiments, is then used as input data into the trained ML models to, e.g., measure the performance of the trained ML models and/or compare performance between them. In some embodiments, where hyperparameters are used, a new set of hyperparameters is determined based on the measured performance of one or more of the trained ML models, and the first step of training (i.e., with the training set) begins again on a different ML model described by the new set of determined hyperparameters. These steps are repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) begins in some embodiments. The output generated from the testing set, in some embodiments, is compared with the corresponding desired target values to give a final assessment of the trained ML model's accuracy. Other segmentations of the larger data set and/or schemes for using the segments for training one or more ML models are possible.

Backpropagation is an algorithm for training an AI model 1830. Backpropagation is used to adjust (also referred to as update) the value of the parameters in the AI model 1830, with the goal of optimizing the objective function. For example, a defined loss function is calculated by forward propagation of an input to obtain an output of the AI model 1830 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some embodiments, other techniques for learning the parameters of the AI model 1830 are used. The process of updating (or learning) the parameters over many iterations is referred to as training. In some embodiments, training is carried out iteratively until a convergence condition is met (e.g., a predefined maximum number of iterations has been performed, or the value outputted by the AI model 1830 is sufficiently converged with the desired target value), after which the AI model 1830 is considered to be sufficiently trained. The values of the learned parameters are then fixed and the AI model 1830 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 1830 typically involves further training the ML model on a number of data samples (which may be smaller in number/cardinality than those used to train the model initially) that closely target the specific task. For example, an AI model 1830 for generating natural language that has been trained generically on publicly available text corpora is, e.g., fine-tuned by further training using specific training samples. In some embodiments, the specific training samples are used to generate language in a certain style or a certain format. For example, the AI model 1830 is trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

In some embodiments, the language model uses a neural network (typically a DNN) to perform NLP tasks. A language model is trained to model how words relate to each other in a textual sequence, based on probabilities. In some embodiments, the language model contains hundreds of thousands of learned parameters, or in the case of a large language model (LLM) contains millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use in language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

Because GPT-type language models tend to have a large number of parameters, these language models are considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model is hosted by a computer system that includes a plurality of cooperating (e.g., cooperating via a network) computer systems that are in, for example, a distributed arrangement. Notably, a remote language model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real-time or near real-time) can require the use of a plurality of processors/cooperating computing devices as discussed above.

In some embodiments, inputs to an LLM are referred to as a prompt (e.g., command set or instruction set), which is a natural language input that includes instructions to the LLM to generate a desired output. In some embodiments, a computer system generates a prompt that is provided as input to the LLM via the LLM's API. As described above, the prompt is processed or pre-processed into a token sequence prior to being provided as input to the LLM via the LLM's API. A prompt includes one or more examples of the desired output, which provides the LLM with additional information to enable the LLM to generate output according to the desired output. Additionally or alternatively, the examples included in a prompt provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples is referred to as a zero-shot prompt.

In some embodiments, the llama2 is used as a large language model, which is a large language model based on an encoder-decoder architecture, and can simultaneously perform text generation and text understanding. The llama2 selects or trains proper pre-training corpus, pre-training targets and pre-training parameters according to different tasks and fields, and adjusts a large language model on the basis so as to improve the performance of the large language model under a specific scene.

In some embodiments, the Falcon40B is used as a large language model, which is a causal decoder-only model. During training, the model predicts the subsequent tokens with a causal language modeling task. The model applies rotational positional embeddings in the model's transformer model and encodes the absolution positional information of the tokens into a rotation matrix.

In some embodiments, the Claude is used as a large language model, which is an autoregressive model trained on a large text corpus unsupervised.

Consequently, alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

We claim:

1. A method for controlling access to a generative artificial intelligence (AI) application programming interface (API) through a web gateway, comprising:

determining an attempt from a user to access a generative AI API via a client application, wherein the client application is configured to receive a command set from the user, and wherein the generative AI API is configured to generate a response based on the command set to the client application;

in response to said determining of the attempt from the user to access the generative AI API, interconnecting, via an egress web gateway, the client application and the generative AI API by redirecting the user from an interface of the client application to an egress interface of the egress web gateway, wherein the egress interface is configured to emulate the interface of the client application, and wherein the egress web gateway is configured to perform any of inspecting or revising communications between the egress interface and the generative AI API, receiving the command set, via the egress web gateway, from the egress interface related to consuming the generative AI API;

inspecting the command set, via the egress web gateway according to a set of predetermined criteria, wherein said inspecting generates a set of results associated with the set of predetermined criteria, wherein each of the set of results of said inspecting corresponds with a predetermined action, and wherein the egress web gateway is configured to implement the predetermined action on the command set;

generating, via the egress web gateway, a set of actions based on the set of results of said inspecting the command set, wherein the set of actions includes predetermined actions corresponding to the set of results; and executing the set of actions, via the egress web gateway, on the command set prior to communication of the command set to the generative AI API.

2. The method of claim 1, wherein, in response to satisfaction according to the set of predetermined criteria by the command set, the set of actions causes the egress web gateway to employ the command set to cause the generative AI API to generate the response.

3. The method of claim 2, further comprising pre-loading at least one hidden parameter, via the egress web gateway, into the generative AI API, wherein the at least one hidden parameter directs the generative AI API to adhere to the at least one hidden parameter during said generation of the response.

4. The method of claim 1, further comprising:

in response to non-satisfaction of the set of predetermined criteria by the command set, discarding, via said execution of the set of actions, at least a portion of the command set, via the egress web gateway.

5. The method of claim 4, further comprising:

in response to non-satisfaction of the set of predetermined criteria by the command set, communicating, via the egress web gateway, a denial notification to the egress interface, wherein the denial notification includes information related to said discarding; and displaying the denial notification on a user interface of the egress interface.

6. The method of claim 1, wherein said execution of the set of actions is based on a prioritization system, wherein the prioritization system ranks the set of actions based on predefined priority parameters.

7. The method of claim 1, wherein the set of actions is configured to cause the egress web gateway to receive a list of rules from the generative AI API for discarding or modifying a portion of the command set, wherein the list of rules relates to providing secure communications between the client application and the generative AI API, and wherein said execution of the set of actions:

employs the egress web gateway to implement the list of rules on the command set by associating each of the set of results with a respective predetermined action, and causes the egress web gateway to employ the command set to cause the generative AI API to generate the response.

8. The method of claim 7, further comprising:

assembling the list of rules inclusive of patterns indicative of private information within the command set, wherein the patterns include any of predefined terms or contextual features associated with the private information within the command set;

detecting, via the egress web gateway, portions of the command set indicative of the patterns.

9. The method of claim 8, further comprising, during said execution of the set of actions:

replacing the detected portions of the command set with anonymized placeholders, wherein the anonymized placeholders maintains contextual relevance of the detected portions of the command set.

10. The method of claim 1, wherein the set of actions includes at least one hallucination check, and wherein the at least one hallucination check is configured to:

assess a likelihood of the generative AI API generating false data based on a predefined dataset of commands within any of the egress web gateway or previously generated responses from the generative AI API; and dynamically adjust the command set based on said assessing to reduce the likelihood of the generative AI API generating false data.

11. The method of claim 1, further comprising monitoring the responses from the generative AI API for any of factual detail discrepancies, syntactic anomalies, or lack of logical consistency within the generated responses based on comparing the generated responses with established facts, rules of former grammar, or desired semantic structures, respectively.

12. The method of claim 1, wherein the egress web gateway is deployed in a cloud environment hosted by a cloud provider with scalable resources, or a self-hosted environment hosted by a private web server.

13. The method of claim 1, wherein said inspecting the command set includes:

employing an AI model to independently assess the command set;

comparing a set of verifying results from said assessment of the command set with the set of results of said inspection via the egress web gateway, and wherein said generating the set of actions is based on concurrence or disparity between the set of verifying results and the set of results.

14. The method of claim 1, wherein said inspection of the command set includes identifying any recurring patterns or anomalies in the command set based on previous inspections of other command sets, and wherein the any recurring patterns or anomalies relate to the satisfaction according to the set of predetermined criteria by the command set.

15. The method of claim 1, further comprising during said inspecting the command set:

defining a set of predefined heuristic rules including established syntactic or established semantic patterns;

systematically comparing distinct portions of the command set, according to the set of predefined heuristic rules, to determine an indication of contextual relevance of the command set.

16. The method of claim 1, wherein said inspecting the command set includes:

associating each of the set of predetermined criteria with a corresponding degree of criteria compliance, and calculating an aggregated criteria compliance level for the command set based on the corresponding degree of criteria compliance for each of the set of predetermined criteria, and wherein said generating the set of actions is based on said calculating.

17. The method of claim 1, wherein said inspection of the command set includes comparing the command set against a predefined list, and wherein the predefined list includes predetermined terms or patterns that are permitted or prohibited by the egress web gateway based on the set of predetermined criteria.

18. The method of claim 1, wherein the client application is a microservice application, wherein the microservice application is comprised of independently deployable services, and wherein the microservice application includes a graphical user interface configured to directly receive the command set or includes a backend process to manage requests by client-side components.

19. The method of claim 1, wherein the egress web gateway includes a pre-configured list of approved generative AI APIs, wherein the egress web gateway denies communication from the egress interface to any generative AI API not included in the pre-configured list.

20. An egress web gateway for modifying command sets to a generative artificial intelligence (AI) application programming interface (API) or upstream generative AI API responses, the egress web gateway comprising:

a) a data store including a set of predetermined criteria;

b) a communication link between a client application and a generative AI application via an egress interface, wherein the client application is configured to receive a command set and a formatted response, wherein the generative AI application is configured to generate a response based on a formatted command set to the client application, wherein the command set or the response include a first format, wherein the formatted command set or the formatted response include a second format, and wherein the first format and the second format are associated with consuming of the generative AI application by the client application or said receiving of the command set by the client application; and c) a processor for executing instructions that perform the steps of:

determining an attempt from a user to access the generative AI application via the client application, in response to said determining of the attempt from the user to access the generative AI application, interconnecting, via the egress web gateway, the client application and the generative AI application by redirecting the user from an interface of the client application to an egress interface of the egress web gateway, wherein the egress interface is configured to emulate the interface of the client application, and receiving the command set or the response, via the communication link, between the egress interface and the generative AI application;

in response to receiving the command set or the response, assessing the first format of the command set or the response to determine satisfaction according to the set of predetermined criteria in the data store, wherein the set of predetermined criteria relates to the second format of the formatted command set or the formatted response, respectively;

in response to a determination that the set of predetermined criteria is not satisfied by the first format, updating the first format to ensure that the first format of the command set or the response corresponds with the second format of the formatted command set or the formatted response, respectively; and deliver the command set or the response to the generative AI application or the egress interface, respectively.

21. The egress web gateway of claim 20, further comprising:

a caching module within a cache, wherein the cache includes previously generated command sets or responses stored locally on a user's device or in a profile on a server, and wherein the caching module employs a cache replacement policy configured to dynamically adjust cache size and organize outputs based on access frequency or temporal relevance of the previously generated command sets or responses.

22. The egress web gateway of claim 20, wherein the set of predetermined criteria is configured to be adjustable via the command set.

23. The egress web gateway of claim 20, further comprising:

selecting the command set from predefined command sets, wherein the predefined command sets include a third format, wherein the third format corresponds with the second format of the command set.

24. The egress web gateway of claim 20, wherein the format of the command set or the response is within metadata of the command set or the response.

25. A method for integration of multiple generative AI providers, the method comprising:

determining an attempt from a user to access at least one of multiple generative AI providers via a client application, wherein the client application is configured to receive a command set from the user, wherein each of the multiple generative AI providers corresponds to an command format, and wherein each of the multiple generative AI providers is configured to generate a response based on the command set to the client application, in response to the command set adhering to the command format of a respective multiple generative AI provider;

in response to said determining of the attempt from the user to access the at least one of the multiple generative AI providers, interconnecting, via an egress proxy point, the client application and the multiple generative AI providers by redirecting the user from an interface of the client application to an egress interface of the egress proxy point, wherein the egress proxy point is configured to use one or more of: a session layer (L5), a presentation layer (L6), or an application layer (L7) of an Open Systems Interconnection (OSI) model to interconnect the client application and the multiple generative AI providers, wherein the egress proxy point is configured to facilitate proxied communications between the egress interface and the multiple generative AI providers, and wherein the egress interface is configured to emulate the interface of the client application;

receiving the command set through one or more of: the L5, the L6, or the L7, via the egress proxy point, from the egress interface, wherein the command set indicates a selected AI provider, and wherein the selected AI provider is one of the multiple generative AI providers;

assessing the command set to determine satisfaction according to a set of predetermined criteria, wherein the set of predetermined criteria relates to any of the command format of the selected AI provider or the format of the command set;

in response to a determination that the set of predetermined criteria is not satisfied by the command set, update the command set to ensure that the command format of the command set corresponds with the command format of the selected AI provider;

tailoring the command set, via the egress proxy point, to adhere to the command format of the selected AI provider; and routing the command set through the one or more of: the L5, the L6, or the L7, via the egress proxy point, to the selected AI provider, wherein the egress proxy point is configured to adjust the selected AI provider via adjusting the command set.

26. The method of claim 25, wherein said tailoring includes translating the command set into a formatted command, and wherein the formatted command corresponds to the command format of the selected AI provider.

27. The method of claim 25, further comprising:

updating, via the egress interface, the selected AI provider in response to a new command set, wherein the new command set includes a different AI provider within the multiple generative AI providers, and wherein the updated selected AI provider corresponds with the different AI provider.

28. The method of claim 26, further comprising, during said routing:

employing encryption algorithms to secure the tailored command sets during said routing to the selected AI provider, wherein the encryption algorithms transform the tailored command sets into ciphertext using a cipher, wherein the ciphertext maintains contextual relevance of the command sets, and wherein the cipher includes predetermined procedures governing said transformation.

29. The method of claim 25, further comprising displaying, via the egress interface, the multiple generative AI providers along with respective performance metrics, wherein the respective performance metrics are based on a suitability of each of the multiple generative AI providers for the command set, wherein the suitability is based on comparing criteria within the command set with abilities of the corresponding generative AI provider.

* * * * *